United States Patent
Koffman

(10) Patent No.: US 10,728,866 B2
(45) Date of Patent: Jul. 28, 2020

(54) METHODS AND APPARATUS FOR PARALLEL SNIFFING OF NON-IDENTICAL MEDIUMS

(71) Applicant: Intel Corporation, Santa Clara, CA (US)

(72) Inventor: Liad Koffman, Maaleh-Adumim (IL)

(73) Assignee: INTEL CORPORATION, Santa Clara, CA (US)

( * ) Notice: Subject to any disclaimer, the term of this patent is extended or adjusted under 35 U.S.C. 154(b) by 12 days.

(21) Appl. No.: 16/230,615

(22) Filed: Dec. 21, 2018

(65) Prior Publication Data

US 2020/0205096 A1    Jun. 25, 2020

(51) Int. Cl.
| | |
|---|---|
| *H04W 56/00* | (2009.01) |
| *H04L 12/26* | (2006.01) |
| *H04W 4/80* | (2018.01) |
| *H04W 24/08* | (2009.01) |
| *H04W 84/12* | (2009.01) |

(52) U.S. Cl.
CPC ........... *H04W 56/001* (2013.01); *H04L 43/04* (2013.01); *H04L 43/106* (2013.01); *H04W 4/80* (2018.02); *H04W 24/08* (2013.01); *H04W 84/12* (2013.01)

(58) Field of Classification Search
CPC .... H04L 43/04; H04L 43/106; H04W 56/001; H04W 4/80; H04W 24/08; H04W 84/12; H04J 11/0093
See application file for complete search history.

(56) References Cited

U.S. PATENT DOCUMENTS

| | | | |
|---|---|---|---|
| 9,137,690 B2* | 9/2015 | Janakiraman | H04W 24/08 |
| 2003/0035388 A1* | 2/2003 | Schmidt | H04L 63/04 |
| | | | 370/329 |
| 2010/0100930 A1* | 4/2010 | King | H04L 63/1433 |
| | | | 726/1 |
| 2015/0201086 A1* | 7/2015 | Abi | H04M 7/006 |
| | | | 370/352 |
| 2019/0190960 A1* | 6/2019 | Amro | H04L 63/30 |
| 2020/0059874 A1* | 2/2020 | Noh | H04J 11/0079 |

FOREIGN PATENT DOCUMENTS

CN    103974309 A    *    8/2014    ......... H04J 11/0093

* cited by examiner

Primary Examiner — Afsar M Qureshi
(74) Attorney, Agent, or Firm — Hanley, Flight & Zimmerman, LLC

(57) ABSTRACT

Methods, apparatus, systems, and articles of manufacture are disclosed for parallel sniffing of non-identical mediums. An example apparatus includes a device configurator to configure a first sniffer using a first parameter of a second sniffer to generate a first data stream, a parameter determiner to identify a common frame included in the first and second data streams, the second data stream generated by the second sniffer and determine a first time-correction factor by determining a difference between a first timestamp and a second timestamp of the common frame in the first and second data streams, and a stream generator to generate a third data stream including first and second data frames, the first data frames based on the first time-correction factor, the second data frames based on a second time-correction factor based on configuring the first sniffer using a second parameter of the third sniffer.

20 Claims, 13 Drawing Sheets

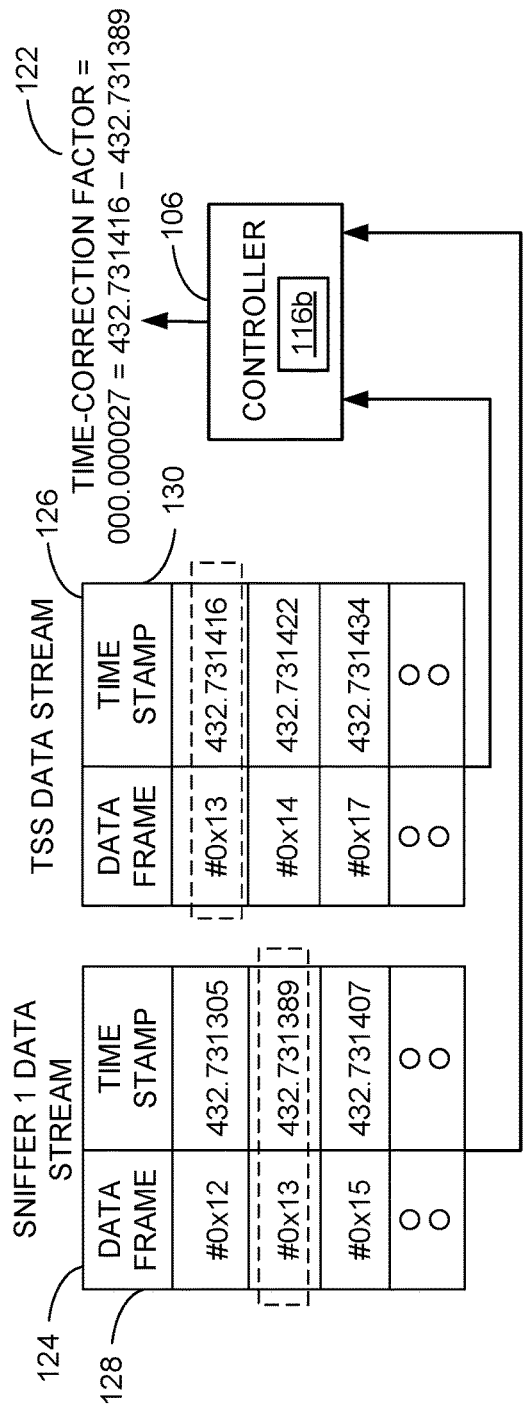
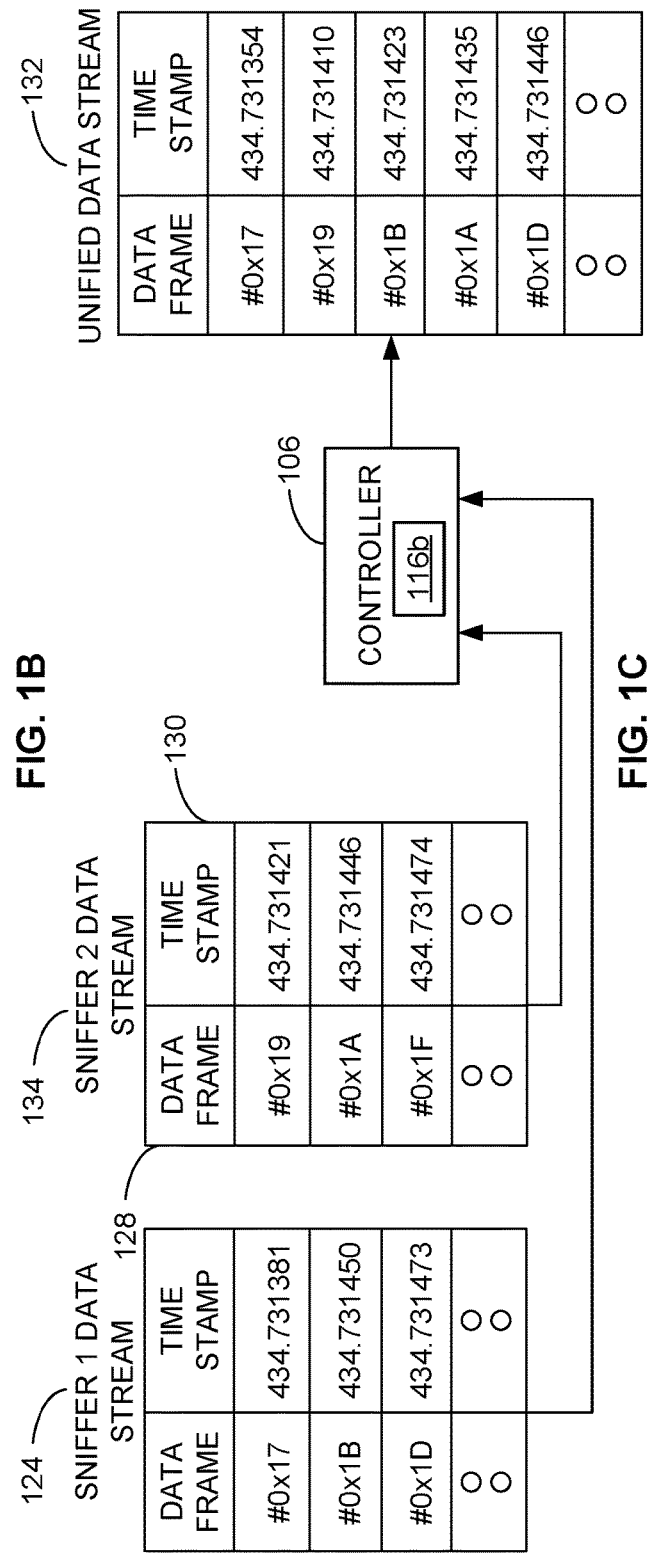
FIG. 1B
FIG. 1C

METHODS AND APPARATUS FOR PARALLEL SNIFFING OF NON-IDENTICAL MEDIUMS

FIELD OF THE DISCLOSURE

This disclosure relates generally to wireless communication and, more particularly, to methods and apparatus for parallel sniffing of non-identical mediums.

BACKGROUND

Many locations provide Wi-Fi to connect Wi-Fi enabled devices to networks such as the Internet. Wi-Fi enabled devices include personal computers, video-game consoles, mobile phones and devices, digital cameras, tablets, smart televisions, digital audio players, etc., one or more of which may also support one or more other wireless communication protocols such as Bluetooth. Wi-Fi allows the Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

FIG. 1B is a schematic illustration of the example controller of FIG. 1A determining a time-correction factor.

FIG. 1C is a schematic illustration of the example controller of FIG. 1A generating a unified data stream based on the time-correction factor of FIG. 1B.

The figures are not to scale. In general, the same reference numbers will be used throughout the drawing(s) and accompanying written description to refer to the same or like parts.

DETAILED DESCRIPTION

Figure 1A:
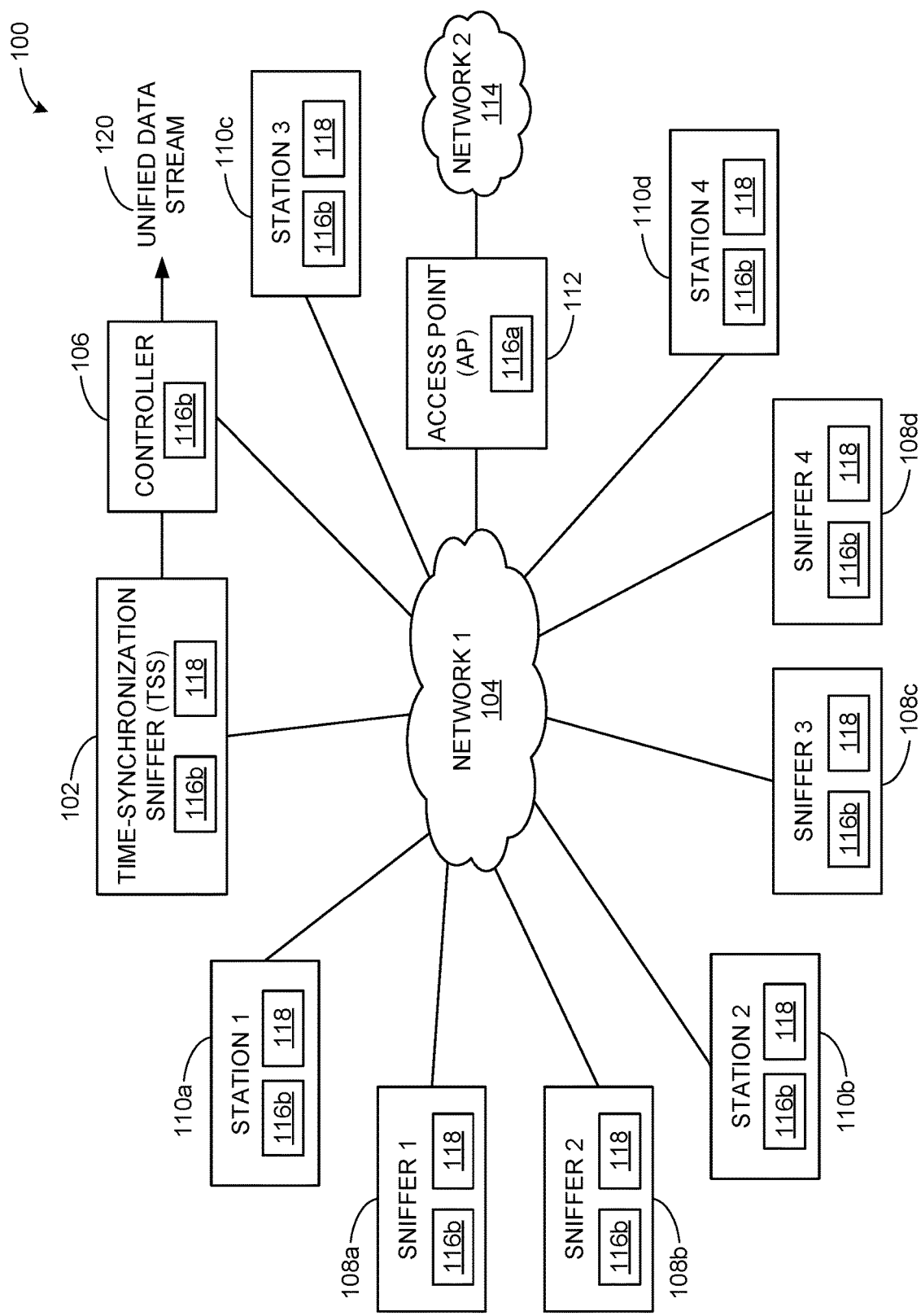
FIG. 1A is a schematic illustration of an example time-synchronization sniffer (TSS) obtaining data streams in a first example network environment including example sniffers, example stations, and an example access point.

Various locations (e.g., homes, offices, coffee shops, restaurants, parks, airports, etc.) may provide Wi-Fi to the Wi-Fi enabled devices (e.g., stations (STA)) to connect the Wi-Fi enabled devices to the Internet, or any other network, with minimal hassle. The locations may provide one or more Wi-Fi access points (APs) to output Wi-Fi signals to the Wi-Fi enabled device within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol for how the AP communicates with the devices to provide access to the Internet by transmitting uplink (UL) transmissions and receiving downlink (DL) transmissions to/from the Internet.

In some instances, various locations may have more than one type of mediums being used. For example, a coffee shop may provide Wi-Fi to various Wi-Fi enabled devices on one or more different Wi-Fi channels. In such examples, one or more of the various Wi-Fi enabled devices may support different connectivity protocols such as Bluetooth. As used herein, different connectivity protocols (e.g., Wi-Fi, Bluetooth, etc.), different connectivity channels (e.g., Wi-Fi channels, Bluetooth channels, etc.), etc., are referred to as "non-identical mediums."

Typically, validating wireless and/or non-wireless protocol operational correctness includes having a station operate as a sniffer that decodes protocol messages, and presents the decoded messages to an end user in an easy-to-read manner. A sniffer can monitor data flowing over wired and/or wireless communication links, or data streams, in real time. However, sniffers built on top of station hardware have a limitation because they are only able to operate over a single medium and protocol at a given time. For example, a sniffer may not capture a data stream from more than one Wi-Fi channel at a given time. Accordingly, synchronizing data streams from sniffers monitoring non-identical mediums is problematic.

In prior implementations, to synchronize data streams from multiple sniffers, multiple sniffers capture different types of data traffic, or data frames, in a single basic service set (BSS) such as 802.11ax multi-user traffic. The captured data frames undergo timestamp updating based on common data frames that all the multiple sniffers see, such as beacons from an AP. However, the common data frames generated by the AP can result in unwanted interference by adding increased communication traffic to already congested network environments.

Examples disclosed herein provide for parallel sniffing of non-identical mediums by correlating frames (e.g., data frames, management frames, etc.) from different sources. Examples disclosed herein provide visibility to data streams across multiple wireless communication mediums at a given time without determining common frames (e.g., common data frames, common management frames, etc.) found in all data streams of all sources. In some disclosed examples, given N non-identical mediums (e.g., N>1) in a network environment, N+1 sniffers are deployed in the network environment, where N of the N+1 sniffers each captures a single different medium. In such disclosed examples, the remaining sniffer, or a time-synchronization sniffer (TSS), is operative to synchronize the data streams generated by the other N sniffers. The example of N=1 is a trivial case that may be handled by prior implementations.

In some disclosed examples, the TSS cyclically skips between the different mediums and sniffs each of the mediums as one of the N sniffers sniffs the corresponding medium. The TSS identifies a common frame (e.g., a common data frame, a common management frame, etc.) between the TSS and a corresponding sniffer for a medium being processed and calculates a time difference between the two captures of the common frame. The time difference is applied to subsequent timestamps of data frames, management frames, etc., captured by that sniffer. The TSS proceeds through all non-identical mediums being monitored, sniffed, etc., to (iteratively) correct the time drift on every sniffer and maintain synchronization on all sniffers in the network environment. Accordingly, the maintained sniffer synchronization can be used to generate a unified and synchronous capture of data traffic (e.g., a unified data stream) on all mediums in real-time. In some disclosed examples, bottlenecks, congestion points, and failures can be identified based on the unified data stream. In some disclosed examples, a station can be instructed to change from a first Wi-Fi channel to a second Wi-Fi channel in response to an identification of a bottleneck, a congestion point, a failure, etc., on the first Wi-Fi channel based on the unified data stream.

FIG. 1A is a schematic illustration of an example network environment 100 that includes an example time-synchronization sniffer (TSS) 102 obtaining data streams in a first example network 104. In FIG. 1A, the network environment 100 includes an example controller 106 communicatively coupled to the TSS 102. The network environment 100 of FIG. 1A includes example sniffers 108a-d including a first example sniffer 108a, a second example sniffer 108b, a third example sniffer 108c, and a fourth example sniffer 108d. The network environment 100 of FIG. 1A includes example stations 110a-d including a first example station 110a, a second example station 110b, a third example station 110c, and a fourth example station 110d. The network environment 100 includes an example AP 112 communicatively coupled to the first network 104 and a second example network 114. Although FIG. 1A includes the networks 104, 114, the AP 112, and network devices including the sniffers 108a-d and the stations 110a-d, examples disclosed herein may be described in conjunction with fewer or more than two networks, more than one AP, fewer or more than four sniffers, and/or fewer or more than four stations.

The network environment 100 of the illustrated example of FIG. 1A corresponds to a geographical area or location in which one or more networks operate. For example, the network environment 100 may be a geographic area or location, such as an Internet café, an office, an airport, a library, a household, etc. While in the illustrated example a single network environment 100 is shown, any number and/or type(s) of network environments may be used.

The first network 104 of FIG. 1A is a system of interconnected systems exchanging data. The first network 104 may be implemented using any type of public or private network such as, but not limited to, the Internet, a telephone network, a local area network (LAN), a cable network, and/or a wireless network. To enable communication via the first network 104, the AP 112 includes a communication interface that enables a connection to an Ethernet, a digital subscriber line (DSL), a telephone line, a coaxial cable, or any wireless connection, etc.

In the illustrated example of FIG. 1A, the TSS 102 is a sniffer. In FIG. 1A, the TSS 102 and the sniffers 108a-d are implemented using wireless network interface cards (NICs) that capture wireless traffic and generate data frames by assigning timestamps to the captured wireless traffic. Additionally or alternatively, the TSS 102 and the sniffers 108a-d may capture wireless traffic and generate management frames by assigning timestamps to the captured wireless traffic, where the wireless traffic is associated with an administrative or management operation by the AP 102 or other wireless device. As described herein, any description, operation, processing, etc., in connection with a data frame can be applicable to a management frame. The TSS 102 and the sniffers 108a-d generate data streams by transmitting the data frames to the controller 106. In FIG. 1A, each of the TSS 102 and the sniffers 108a-d corresponds to a different computing device or physical machine such as, a personal computer, a mobile device, a server, etc. For example, the first sniffer 108a may be included in a first computing device, the second sniffer 108b may be included in a second computing device, etc. In other examples, one or more of the TSS 102 and the sniffers 108a-d are included in the same computing device. For example, the TSS 102, the first sniffer 108a, and the second sniffer 108b may be included in the first computing device.

In FIG. 1A, the TSS 102 and the sniffers 108a-d include an example parameter configurator 118, additional processors (e.g., an example application processor 712 as described below in connection with FIG. 7), and/or an example radio architecture 116b (e.g., the Front-End Module Circuitry WLAN 704a, the Front-End Module Circuitry BT 704b, etc., of FIG. 7). The radio architecture 116b wirelessly transmits and receives data based on parameters configured and/or otherwise assigned by the parameter configurator 118. The radio architecture 116b is further described below in connection with FIG. 7. In FIG. 1A, the TSS 102 and the sniffers 108a-d include the parameter configurator 118 to receive and process configuration adjustments from the controller 106. For example, the controller 106 may transmit instructions to the first sniffer 108a to change one or more capture parameters. In other examples, the controller 106 may transmit instructions to the TSS 102 via the parameter configurator 118 to instruct the TSS 102 to change one or more capture parameters. For example, the parameter configurator 118 may change the one or more capture parameters of the TSS 102 to match one or more of the capture parameters used by the first station 110a based on the instructions from the controller 106.

In the illustrated example of FIG. 1A, the stations 110a-d are Wi-Fi enabled computing devices. One or more of the stations 110a-d may be, for example, a computing device, a portable device, a mobile device, a mobile telephone, a smart phone, a tablet, a gaming system, a digital camera, a digital video recorder, a television, a set top box, an e-book reader, and/or any other Wi-Fi enabled device. For example, the stations 110a-d may be communicatively coupled to the second network 114 via the AP 112. In such examples, the stations 110a-d can receive data from and/or transmit data to the second network 114. In FIG. 1A, the stations 110a-d are using different Wi-Fi channels. For example, the first station 110a may be using a first Wi-Fi channel, the second station 110*b* may be using a second Wi-Fi channel, etc., where the second Wi-Fi channel is different from the first Wi-Fi channel.

In FIG. 1A, one or more of the stations 110*a-d* are Bluetooth enabled computing devices. For example, the first station 110*a* may be communicatively coupled to the second station 110*b* via a first Bluetooth channel. In some examples, the stations 110*a-d* that are Bluetooth enabled are using different Bluetooth channels. For example, the third station 110*c* may be communicatively coupled to the fourth station 110*d* via a second Bluetooth channel, where the second Bluetooth channel is different from the first Bluetooth channel. In FIG. 1A, the stations 110*a-d* include the radio architecture 116*b* (e.g., the Front-End Module Circuitry WLAN 704*a*, the Front-End Module Circuitry BT 704*b*, etc.) and/or other processors (e.g., the application processor 710 of FIG. 7). The stations 110*a-d* include the parameter configurator 118 to receive and process configuration adjustments from the AP 112. For example, the AP 112 may transmit instructions to the first station 110*a* via the parameter configurator 118 to instruct the first station 110*a* to switch to a different Wi-Fi channel or other medium.

The AP 112 of FIG. 1A is a device that allows the stations 110*a-d* to wirelessly access the second network 114. The AP 112 may be a router, a modem-router, and/or any other device that provides a wireless connection to a network. A router provides a wireless communication link to a station. The router accesses the network through a wire connection via a modem. A modem-router combines the functionalities of the modem and the router. In FIG. 1A, the AP 112 includes an example radio architecture 116*a* (e.g., the Front-End Module Circuitry WLAN 704*a*, the Front-End Module Circuitry BT 704*b*, etc.) and/or other processors (e.g., the application processor 710 of FIG. 7). The radio architecture 116*a* is further described below in connection with FIG. 7.

The second network 114 of the illustrated example of FIG. 1A is the Internet. However, the second network 114 can be implemented using any suitable wired and/or wireless network(s) including, for example, one or more data buses, one or more Local Area Networks (LANs), one or more wireless LANs, one or more cellular networks, one or more private networks, one or more public networks, etc. In some examples, the second network 114 enables the stations 110*a-d* to be in communication with an external computing device (e.g., a server) coupled to the second network 114.

In FIG. 1A, the controller 106 is hardware logic, machine readable instructions, hardware implemented state machines, and/or any combination thereof. For example, the controller 106 can include at least one processor executing computer readable instructions. In some examples, the controller 106 is separate hardware from the TSS 102. In other examples, the controller 106 may be included in the same computing device or physical machine as the TSS 102. In yet other examples, the controller 106 may be included in the same computing device or physical machine as one or more of the sniffers 108*a-d*, one of stations 110*a-d*, and/or the AP 112. For example, a laptop computer may include the TSS 102, the controller 106, and one or more of the sniffers 108*a-d*. In such examples, the TSS 102, the controller 106, and the one or more sniffers 108*a-d* may be connected via one or more PCI-e connections.

In FIG. 1A, the controller 106 includes additional processors (e.g., the application processor 710 as described below in connection with FIG. 7) and/or the radio architecture 116*b*. The radio architecture 116*b* wirelessly transmits and receives data based on parameters configured and/or otherwise assigned by the controller 106. The radio architecture 116*b* is further described below in connection with FIG. 7.

In the illustrated example of FIG. 1A, the controller 106 is communicatively coupled to the TSS 102 and the first network 104. In FIG. 1A, the controller 106 receives and synchronizes the data streams associated with the sniffers 106*a-d* based on the data stream received from the TSS 102 and generates an example unified data stream 120. For example, the unified data stream 120 may be an output data stream, a unified output stream, etc. In some examples, the unified data stream 120 includes data frames captured by the sniffers 108*a-d* that are listed based on timestamps. For example, the unified data stream 120 may include a first data frame with a first timestamp that appears before a second data frame with a second timestamp, where the first timestamp is older than the second timestamp. In such examples, the first data frame and the second data frame may be captured from non-identical mediums. For example, the first data frame may be captured from a first Wi-Fi channel and the second data frame may be captured from a second Wi-Fi channel. In other examples, the first data frame may be a Wi-Fi data frame and the second data frame may be a Bluetooth data frame.

In FIG. 1A, the controller 106 accesses the sniffers 108*a-d* and the stations 110*a-d* via the network 104. For example, the controller 106 may access one or more of the sniffers 108*a-d* and/or one or more of the stations 110*a-d* via LAN, Wi-Fi, Bluetooth, etc. In other examples, the controller 106 may access one or more of the sniffers 108*a-d* via a Peripheral Component Interconnect Express (PCI-e) connection, or any other wired connectivity means. For example, the controller 106 may be communicatively coupled to one or more of the sniffers 108*a-d* via a PCI-e connection when the controller 106 and the one or more of the sniffers 108*a-d* are included in the same computing device.

The controller 106 of FIG. 1A configures the sniffers 108*a-d* using one or more wireless parameters (e.g., Wi-Fi parameters, Bluetooth parameters, etc.) associated with configurations of the stations 110*a-d*. For example, the controller 106 may configure the sniffers 108*a-d* by setting a service set identifier (SSID) (e.g., a wireless SSID), a channel (e.g., a wireless channel), a frequency (e.g., a wireless frequency), etc.

In some examples, the controller 106 configures the sniffers 108*a-d* using one or more Wi-Fi parameters (e.g., Wi-Fi capture parameters, Wi-Fi sniffing parameters, etc.) associated with configurations of the stations 110*a-d*. For example, the controller 106 may configure the first sniffer 108*a* by setting a Wi-Fi SSID, a Wi-Fi channel, a Wi-Fi frequency, etc., to that of the Wi-Fi SSID, the Wi-Fi channel, the Wi-Fi frequency, etc., of the first station 110*a*. Additionally or alternatively, the controller 106 may configure the first sniffer 108*a* using any other Wi-Fi configuration, Wi-Fi parameter, etc.

In some examples, the controller 106 of FIG. 1A configures the sniffers 108*a-d* using one or more Bluetooth parameters (e.g., Bluetooth capture parameters, Bluetooth sniffing parameters, etc.) associated with configurations of the stations 110*a-d*. For example, the controller 106 may configure the first sniffer 108*a* by setting a Bluetooth SSID, a Bluetooth channel, a Bluetooth frequency, etc., to that of the Bluetooth SSID, the Bluetooth channel, the Bluetooth frequency, etc., of the first station 110*a*. Additionally or alternatively, the controller 106 may configure the first sniffer 108*a* using any other Bluetooth configuration, Bluetooth parameter, etc. Additionally or alternatively, the controller 106 may configure the first sniffer 108a using any other wireless protocol configuration, wireless protocol parameters, etc.

In FIG. 1A, the controller 106 synchronizes the data streams obtained by the sniffers 108a-d by configuring (e.g., periodically configuring, iteratively configuring, etc.) the TSS 102 using the same capture parameters as a sniffer of interest or a sniffer to be synchronized. For example, the controller 106 may configure the TSS 102 using the same sniffing parameters as the first sniffer 108a. In such examples, the controller 106 can configure the TSS 102 to have the same SSID, channel (e.g., Wi-Fi channel, Bluetooth channel, etc.), frequency (e.g., Wi-Fi frequency, Bluetooth frequency, etc.), etc., as the first sniffer 108a. In response to being configured, the TSS 102 captures the same network traffic as the first sniffer 108a. The TSS 102 and the first sniffer 108a transmit the captured network traffic as data streams to the controller 106 for synchronization.

In some examples, the TSS 102 captures network traffic on a medium using the capture parameters of the first sniffer 108a for a quantity of time that is inversely proportional to a quantity of network traffic of the medium. For example, if there is a large quantity of network traffic on the medium, then a data frame, a management frame, etc., captured by both the TSS 102 and the first sniffer 108a is likely to be captured more quickly, or in less time, compared to when there is a smaller quantity of network traffic on the medium.

In FIG. 1A, the controller 106 identifies a common data frame that are included in both data streams of the TSS 102 and the first sniffer 108a. Additionally or alternatively, the controller 106 may identify a common management frame included in both of the data streams of the TSS 102 and the first sniffer 108a. When the controller 106 identifies the common data frame, the controller 106 calculates and stores a time-correction factor associated with the first sniffer 108a. The time-correction factor is a difference between a first timestamp corresponding to when a sniffer of interest (e.g., the first sniffer 108a) captured the common data frame and a second timestamp corresponding to when the TSS 102 captured the common data frame. The controller 106 applies the time-correction factor to subsequently received data frames from the first sniffer 108a. When the controller 106 determines the time-correction factor for the first sniffer 108a, the controller 106 configures the TSS 102 using sniffing parameters associated with another sniffer of interest, such as the second sniffer 108b. The controller 106 periodically configures the TSS 102 to determine time-correction factors to correct time drifts of the sniffers 108a-d. For example, the controller 106 may cyclically and sequentially configure the TSS 102 to determine a first time-correction factor associated with the first sniffer 108a, a second time-correction factor associated with the second sniffer 108b, etc. In such examples, the controller 106 can configure the TSS 102 to the same capture parameters as the first sniffer 108a after the first through fourth sniffers 108a-d of FIG. 1A have been processed.

In the illustrated example of FIG. 1A, the controller 106 synchronizes data frames of incoming data streams from the sniffers 108a-d based on the time-correction factors. In some examples, the controller 106 selects a frame index of a data stream to process. For example, the controller 106 may select a first frame index of the data streams of the sniffers 108a-d to process. In such examples, the controller 106 can read first data frames at the first frame index of the data streams into a buffer. For example, the controller 106 may read a first data frame from a first frame index of a first data stream of the first sniffer 108a, a second data frame from a second frame index of a second data stream of the second sniffer 108b, etc. The controller 106 applies time-correction factors to corresponding ones of the first data frames. For example, the controller 106 may apply a first time-correction factor associated with the first sniffer 108a to the first data frame, a second time-correction factor associated with the second sniffer 108b to the second data frame, etc.

In response to applying the time-correction factors to the first data frames, the controller 106 generates the unified data stream 120. For example, the controller 106 may select one of the first data frames with the oldest timestamp. In such examples, the controller 106 can select the second data frame based on the second data frame having an older timestamp than the first data frame after applying the first and second time-correction factors. The controller 106 outputs the data frames to the unified data stream 120 from the oldest timestamp to the newest timestamp. For example, the controller 106 may output the second data frame to the unified data stream 120 followed by the first data frame. In response to processing the first data frames, the controller 106 can select second data frames at a second frame index of interest to process, where the second frame index has data frames captured after the first data frames at the first frame index.

Advantageously, the controller 106 can improve operation of the first network 104 by synchronizing the data streams of the sniffers 108a-d. In some examples, the AP 112 can adjust a parameter of the stations 110a-d based on the unified data stream 120 generated by the controller 106. For example, the AP 112 can determine that a first Wi-Fi channel, a first Bluetooth channel, etc., is being overutilized (e.g., a bottleneck is occurring and is throttling bandwidth). In such examples, the AP 112 can direct one or more of the stations 110a-d to move from the first Wi-Fi channel, the first Bluetooth channel, etc., to a second Wi-Fi channel, a second Bluetooth channel, etc., where the second Wi-Fi channel, the second Bluetooth channel, etc., is not being overutilized. For example, the AP 112 can instruct the first station 110a to move from the first Wi-Fi channel that has a channel utilization of 95% to the second Wi-Fi channel that has a channel utilization of 30%. In such examples, the AP 112 can determine whether the channel utilization is above a channel utilization threshold and adjust a parameter of one or more of the stations 110a-d when the channel utilization is greater than and/or otherwise satisfies the channel utilization threshold.

In some examples, the AP 112 can direct one or more of the stations 110a-d to switch to a different medium. For example, the first station 110a may be connected to the AP 112 using a first Wi-Fi channel that the controller 106 determined has failed based on the unified data stream 120. For example, the controller 106 may determine that there are no recent data streams being received from the first station 110a. In such examples, first station 110a is unable to facilitate data communication with the second network 114 based on the failed Wi-Fi channel. The AP 112 can instruct the first station 110a to fail-over or switch-over from Wi-Fi to Bluetooth when communicating to the second network 114 via the AP 112 based on information included in the unified data stream 120.

FIG. 1B is a schematic illustration of the controller 106 of FIG. 1A determining an example time-correction factor 122. In FIG. 1B, the time-correction factor 122 is based on a first example data stream 124 corresponding to the first sniffer 108a and a second example data stream 126 corresponding to the TSS 102 of FIG. 1A. The data streams 124, 126 include example data frames 128 and corresponding example timestamps 130. In FIG. 1B, the data frames 128 are data frame identifiers. Additionally or alternatively, the data frames 128 may correspond to any other data including payload information. In FIG. 1B, the first sniffer 108*a* and the TSS 102 transmit the data streams 124, 126 to the controller 106.

In the illustrated example of FIG. 1B, the controller 106 identifies a common frame #0x13 included in the first data stream 124 and the second data stream 126. The controller 106 determines a time-correction factor by determining a difference between a first timestamp of the data frame #0x13 in the first data stream 124 and a second timestamp of the data frame #0x13 in the second data stream 126. In FIG. 1B, the controller 106 determines a time-correction factor 122 of 000.000027 (e.g., 000.000027 milliseconds (ms)) based on the difference. The controller 106 can associate the time-correction factor 122 with the first sniffer 108*a* and apply the time-correction factor 122 to subsequently received data streams from the first sniffer 108*a*. In other examples, the time-correction factor 122 may be any other value.

FIG. 1C is a schematic illustration of the controller 106 of FIG. 1A generating an example unified data stream 132 based on the time-correction factor 122 of FIG. 1B. The unified data stream 132 of FIG. 1C may correspond to the unified data stream 120 of FIG. 1A. In FIG. 1C, the controller 106 obtains the first data stream 124 from the first sniffer 108*a* of FIG. 1A and a third example data stream 134 from the second sniffer 108*b* of FIG. 1A. The controller 106 generates the unified data stream 132 based on the time-correction factor 122 of FIG. 1B corresponding to the first data stream 124 and a second time-correction factor corresponding to the third data stream 134. In FIG. 1C, the second time-correction factor is 000.000011 (e.g., 000.000011 ms). In other examples, the second time-correction factor may be any other value.

The unified data stream 132 of FIG. 1C is generated by the controller 106 by applying the time-correction factor 122 of FIG. 1B to timestamps included in the first data stream 124 and applying the second-time correction factor to timestamps included in the third data stream 134. For example, although data frame #0x1B in the first data stream 124 had a timestamp greater than data frame #0x1A in the third data stream 134, data frame #0x1B appears before data frame #0x1A in the unified data stream 132 after applying the time-correction factors. Advantageously, the controller 106 generates the unified data stream 132 of FIG. 1C based on data streams from different mediums to facilitate network management of the network environment 100 of FIG. 1A.

Figure 2:
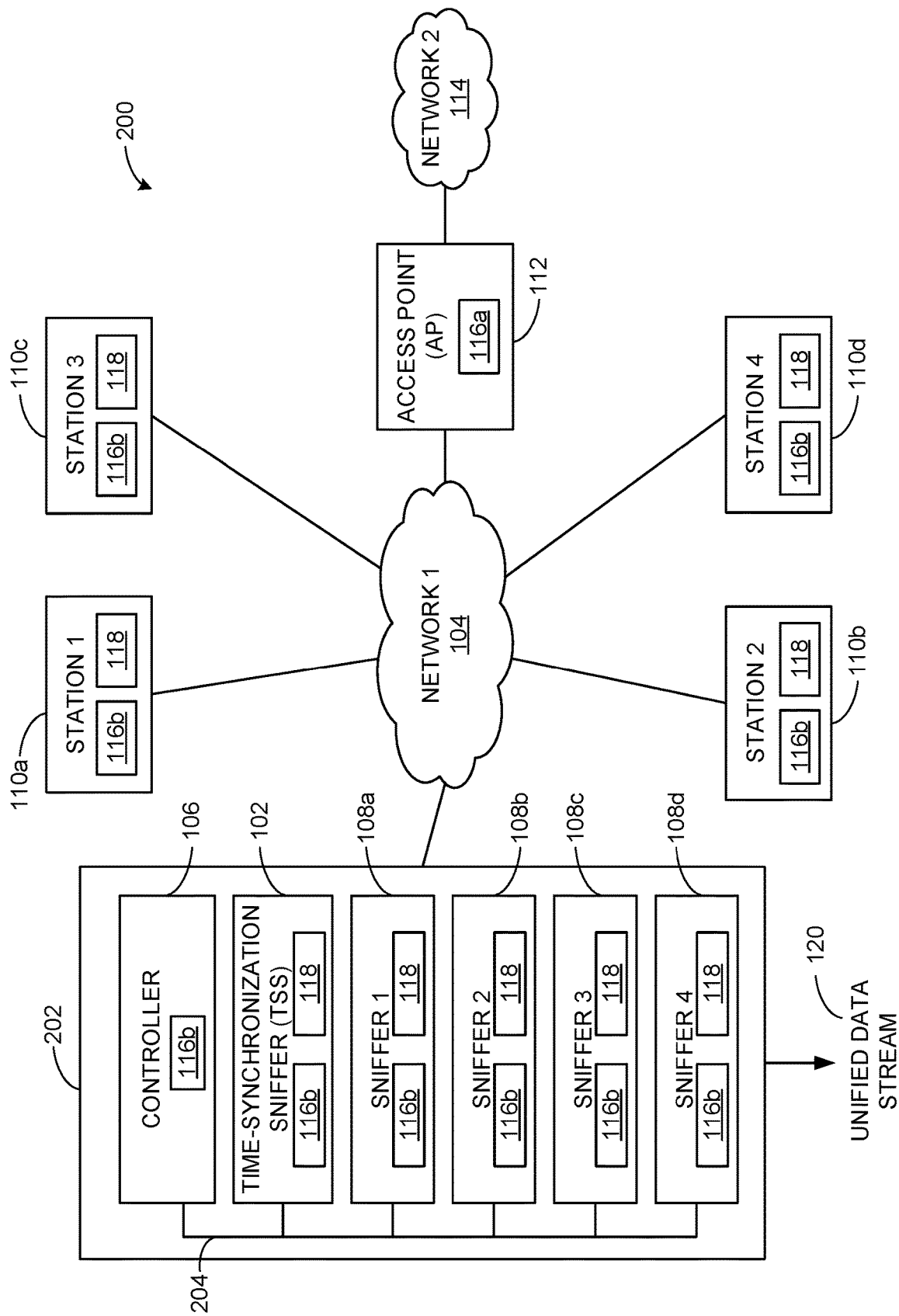
FIG. 2 is a schematic illustration of an example computing device including the example TSS of FIG. 1A obtaining data streams in a second example network environment of FIG. 1A.

FIG. 2 is a schematic illustration of a second example network environment 200 that includes the TSS 102 of FIG. 1A obtaining data streams in the first network 104 of FIG. 1A. In FIG. 2, the second network environment 200 includes the stations 110*a-d* of FIG. 1A, the AP 112 of FIG. 1A, and the second network 114 of FIG. 1A. In FIG. 2, an example computing device 202 is communicatively coupled to the first network 104.

The computing device 202 of FIG. 2 is a personal computer (e.g., a laptop computer, a desktop computer, etc.). Alternatively, the computing device 202 may be a mobile device, a server, etc., or any other device including one or more processors. In FIG. 2, the computing device 202 includes the TSS 102, the controller 106, and the sniffers 108*a-d* of FIG. 1A. In FIG. 2, the TSS 102, the controller 106, and the sniffers 108*a-d* are coupled via an example interface 204. In FIG. 2, the interface 204 is a PCI-e interface. Alternatively, the TSS 102, the controller 106, and the sniffers 108*a-d* may be coupled via any other interface. Additionally or alternatively, the computing device 202 may include more than one TSS 102, more than one controller 106, and/or fewer or more than four sniffers. Alternatively, the computing device 202 may not include one or more of the TSS 102, the controller 106, and/or one or more of the sniffers 108*a-d*.

In the illustrated example of FIG. 2, the controller 106 configures each of the sniffers 108*a-d* via the interface 204 to capture network traffic associated with a different one of the stations 110*a-d*. For example, the controller 106 may configure the first sniffer 108*a* using the same capture parameters as the first station 110*a*. In FIG. 2, the controller 106 cyclically configures the TSS 102 via the interface 204 to capture network traffic using the same capture parameters as one of the sniffers 108*a-d*. For example, the controller 106 may configure the TSS 102 using the capture parameters associated with the first sniffer 108*a*, followed by capture parameters associated with the second sniffer 108*b*, and so on.

Figure 3:
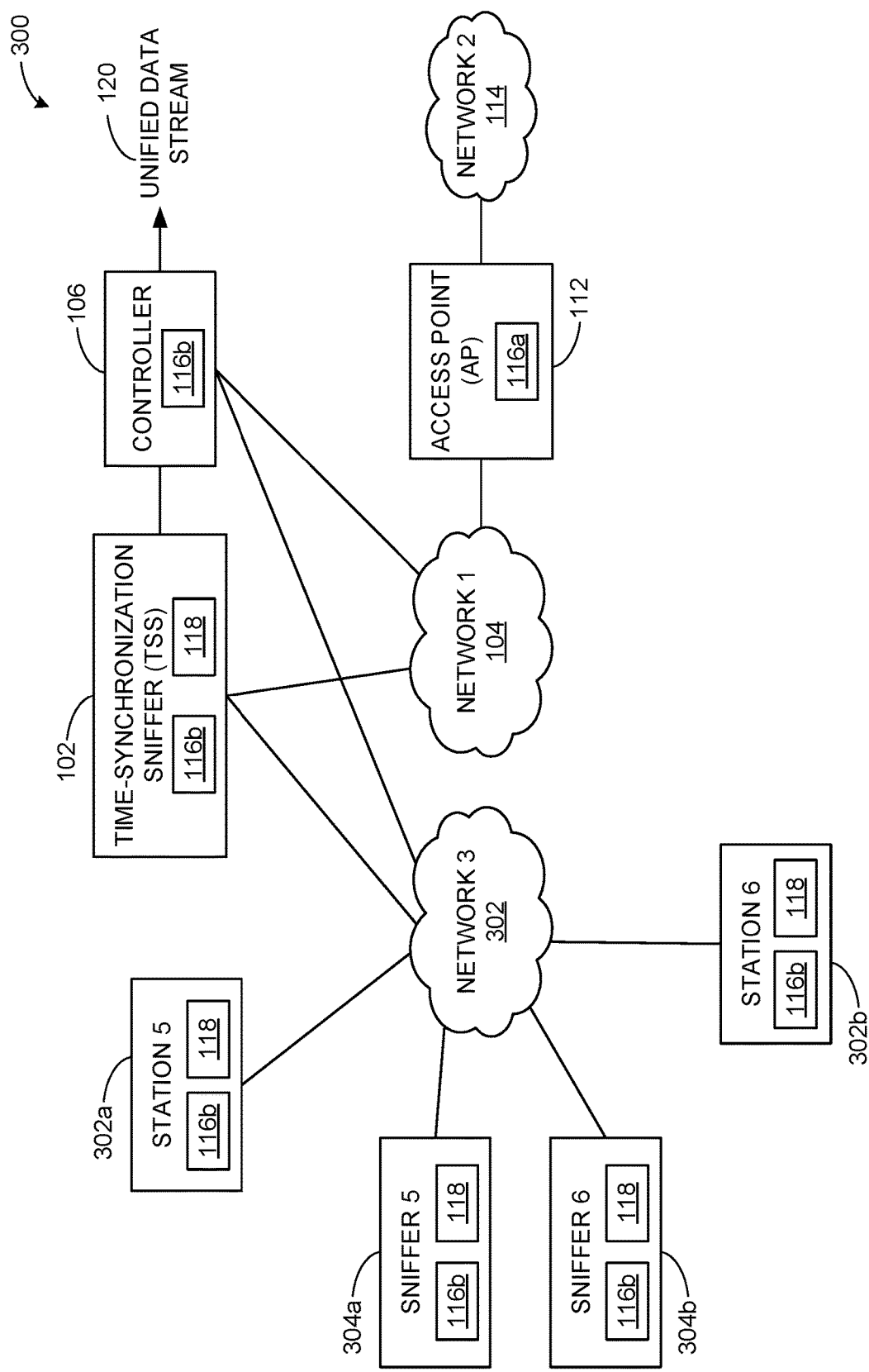
FIG. 3 is a schematic illustration of the example TSS of FIG. 1A obtaining data streams in a third example network environment.

FIG. 3 is a schematic illustration of a third example network environment 300 that includes the TSS 102 of FIG. 1A obtaining data streams in the first network 104 of FIGS. 1-2 and a third example network 302. The third network environment 300 of FIG. 3 includes the stations 110*a-d* of FIGS. 1-2 that are communicatively coupled to the first network 104 but have been removed for clarity purposes. The third network environment 300 of FIG. 3 includes the AP 112 of FIGS. 1-2, and the second network 114 of FIGS. 1-2. In FIG. 2, an example computing device 202 is communicatively coupled to the first network 104.

In FIG. 3, the third network environment 300 includes a fifth example station 302*a*, a sixth example station 302*b*, a fifth example sniffer 304*a*, and a sixth example sniffer 304*b*. The fifth station 302*a*, the sixth station 302*b*, the fifth sniffer 304*a*, and the sixth sniffer 304*b* each include the radio architecture 116*b*. In operation, the controller 106 configures each of the sniffers 108*a-d* of FIGS. 1-2, the fifth sniffer 304*a*, and the sixth sniffer 304*b* to capture network traffic associated with a different one of the stations 110*a-d* of FIGS. 1-2, the fifth station 302*a*, and/or the sixth station 302*b*. For example, the controller 106 may configure the first sniffer 108*a* of FIGS. 1-2 using the same capture parameters as the first station 110*a* of FIGS. 1-2 to capture network traffic associated with the first network 104. In other examples, the controller 106 may configure the fifth sniffer 304*a* using the same capture parameters as the fifth station 302*a* to capture network traffic associated with the third network 302.

In FIG. 3, the controller 106 cyclically configures the TSS 102 to capture network traffic associated with the first network 104 and/or the third network 302. For example, the controller 106 may configure the TSS 102 using the same capture parameters as the first sniffer 108*a* of FIGS. 1-2 to capture network traffic associated with the first network 104. In other examples, the controller 106 may configure the TSS 102 using the same capture parameters as the fifth sniffer 304*a* to capture network traffic associated with the third network 302. Additionally or alternatively, more than one TSS 102 may be used in the third network environment 300. For example, a first set of TSS 102 including one or more TSS 102 may configure the fifth station 302*a*, the sixth station 302*b*, the fifth sniffer 304*a*, and/or the sixth sniffer 304*b*. In other examples, a second set of TSS 102 including one or more TSS 102 different from the one or more TSS 102 included in the first set may configure the sniffers 108*a-d* and/or the stations 110*a-d* of FIGS. 1-2.

Figure 4:
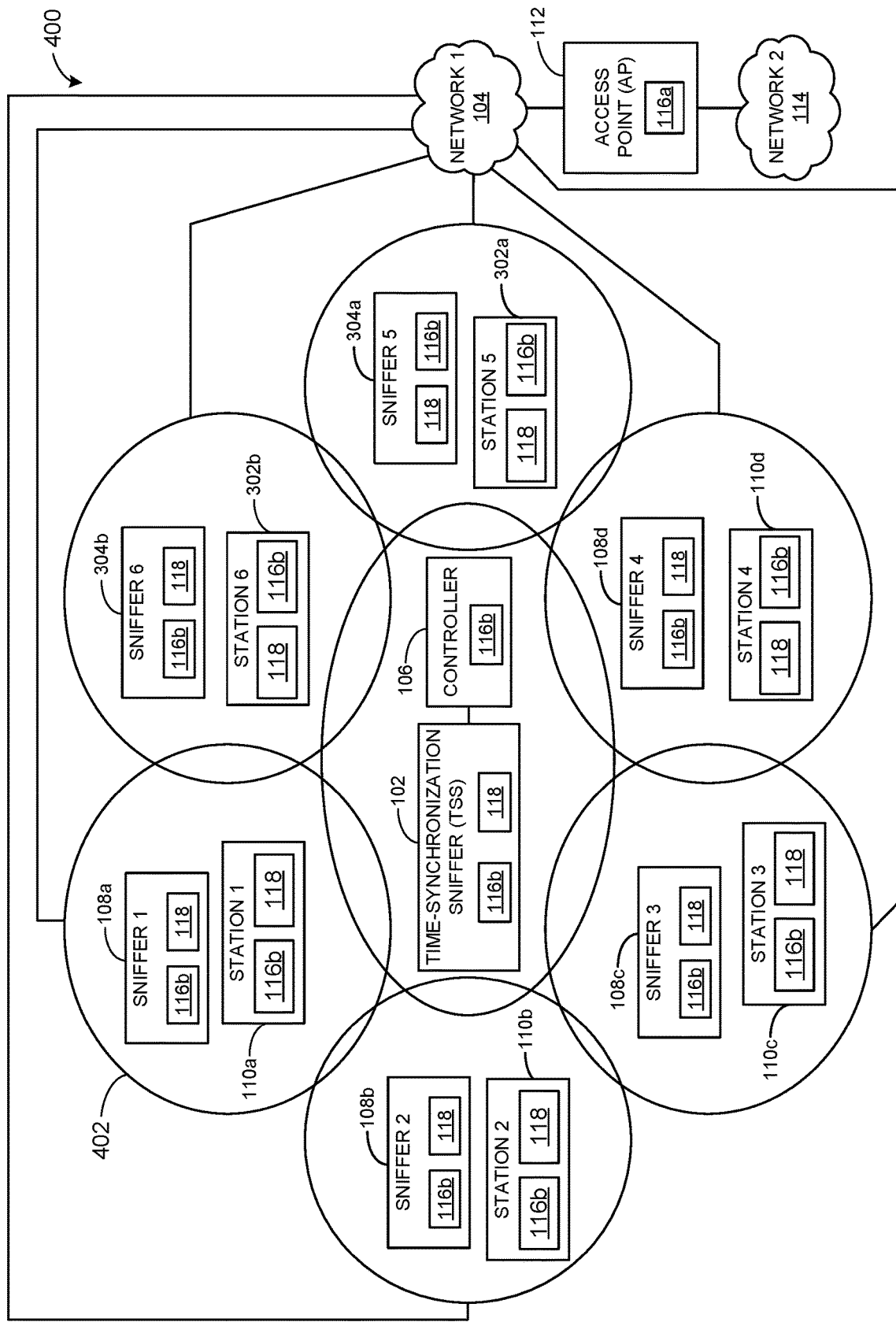
FIG. 4 is a schematic illustration of the example TSS of FIG. 1A obtaining data streams from example stations in an extended capture area.

FIG. 4 is a schematic illustration of a fourth example network environment 400 that includes the TSS 102 of FIGS. 1-3 obtaining data streams in the first network 104 of FIGS. 1-3 to extend an effective capture area. In FIG. 4, the fourth network environment 400 includes the controller 106 of FIGS. 1-3, the AP 112 of FIGS. 1-3 and the second network 114 of FIGS. 1-3. In FIG. 4, the fourth network environment 400 includes the sniffers 108a-d of FIGS. 1-2, the fifth sniffer 304a, and the sixth sniffer 304b of FIG. 3. In FIG. 4, the fourth network environment 400 includes the stations 110a-d of FIGS. 1-2, the fifth station 302a, and the sixth station 302b of FIG. 3.

In the illustrated example of FIG. 4, the sniffers 108a-d, 304a-b each capture network traffic within a specified signal range and, thus, is limited to example physical area sizes 402. Advantageously, the sniffers 108a-d, 304a-b can be arranged in a manner to extend the sniffing area compared to prior examples. In FIG. 4, the sniffers 108a-d, 304a-b are arranged to overlap with one another to facilitate synchronization of data frame timestamps by the controller 106. In FIG. 4, the TSS 102 is disposed in an area of the fourth network environment 400 to overlap with each of the sniffers 108a-d, 304a-b. Although the TSS 102 and the sniffers 108a-d, 304a-b are arranged in a hexagonal arrangement or layout, alternatively, other arrangements or layouts of the TSS 102 and/or the sniffers 108a-d, 304a-b may be used.

In some examples, the TSS 102 is moveable. For example, the TSS 102 may be capable of being moved to different areas of the fourth network environment 400. In such examples, the TSS 102 can be included in and/or otherwise coupled to a mobile apparatus such as a vehicle (e.g., a boat, an unmanned aerial vehicle (UAV), a passenger vehicle, etc.) that can move from sniffing area to sniffing area of the fourth network environment 400. For example, the TSS 102 may move from a first sniffer area associated with the first sniffer 108a to a second sniffer area associated with the second sniffer 108b, where the controller 106 configures the TSS 102 to match the first sniffer 108a when moving to the first sniffer area and the second sniffer 108b when moving to the second sniffer area.

Figure 5:
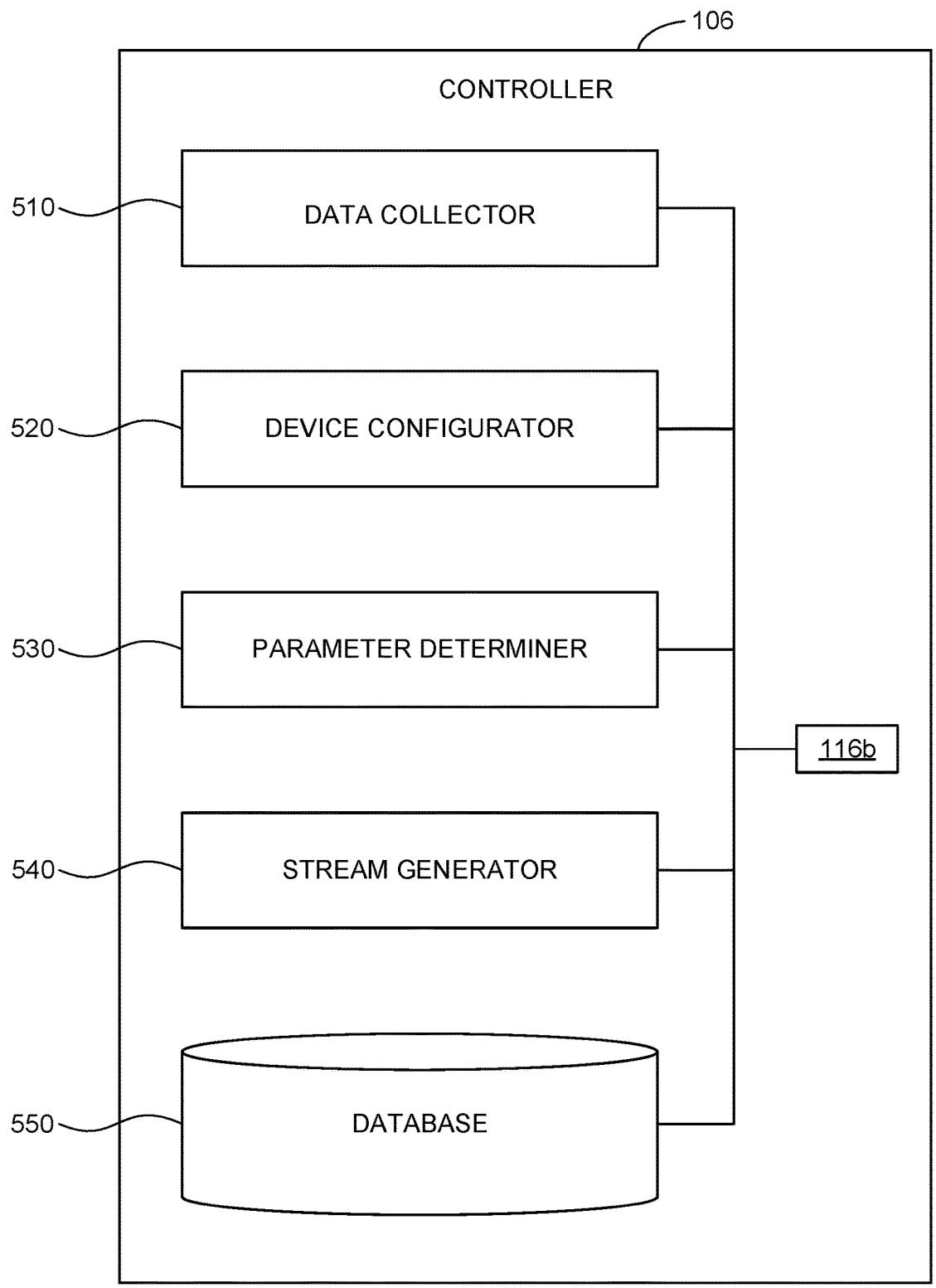
FIG. 5 is a block diagram of an example controller to synchronize data streams of the example sniffers of FIGS. 1A and 2-4.

FIG. 5 is a block diagram of an example implementation of the controller 106 of FIGS. 1-4 to synchronize data streams obtained from sniffers. In FIG. 5, the controller 106 an example data collector 510, an example device configurator 520, an example parameter determiner 530, an example stream generator 540, and an example database 550. In FIG. 5, the controller 106 is in communication with the radio architecture 116b of FIG. 7.

In the illustrated example of FIG. 5, the controller 106 includes the data collector 510 to obtain information from a device, such as a station or a sniffer. In FIG. 5, the data collector 510 receives and/or transmits data to the radio architecture 116b. For example, the data collector 510 may instruct the application processor 710 of FIG. 7 to receive and/or transmit data via a wireless connection.

In some examples, the data collector 510 includes means to obtain data streams from a sniffer. For example, the data collector 510 may obtain a data stream from one or more of the TSS 102 of FIG. 1A, the sniffers 108a-d of FIG. 1A, the fifth sniffer 304a of FIG. 3, and/or the sixth sniffer 304b of FIG. 3. In such examples, the data stream can include data frames based on captured network traffic and timestamps at which the data frames are generated (e.g., when the network traffic is captured). In some examples, the data collector 510 stores the information such as the data streams in the database 550.

In some examples, the data collector 510 includes means to obtain station parameters and/or sniffer parameters. For example, the data collector 510 may obtain one or more station parameters of the stations 110a-d of FIG. 1A, the fifth station 302a of FIG. 3, and/or sixth station 302b of FIG. 3. In such examples, the station parameters can include a SSID, a channel, a frequency, etc. In other examples, the data collector 510 may obtain one or more sniffer parameters of the sniffers 108a-d of FIG. 1A, the fifth sniffer 304a, and/or the sixth sniffer 304b. In such examples, the sniffer parameters can include the SSID, the channel, the frequency, etc.

In the illustrated example of FIG. 5, the controller 106 includes the device configurator 520 to adjust and/or otherwise modify a device, such as a sniffer or a station. In FIG. 5, the device configurator 520 receives and/or transmits data to the radio architecture 116b of FIG. 7. For example, the device configurator 520 may instruct the application processor 710 to configure the TSS 102, one of the sniffers 108a-d, 304a-b, one of the stations 110a-d, 302a-b, etc., using one or more capture parameters, station parameters, etc.

In some examples, the device configurator 520 includes means to configure a sniffer, such as the TSS 102 or one of the sniffers 108a-d, 304a-b of FIGS. 1-3. For example, the device configurator 520 may instruct the TSS 102 to change capture parameters of the TSS 102 to capture parameters associated with one of the sniffers 108a-d, 304a-b. In such examples, the device configurator 520 can instruct the TSS 102 to change an SSID, a channel, a frequency, etc., and/or a combination thereof to the SSID, the channel, the frequency, etc., of the first sniffer 108a. In other examples, the device configurator 520 can direct the first sniffer 108a to change to a different SSID, channel, frequency, etc., and/or a combination thereof. In some examples, the device configurator 520 retrieves the capture parameters to configure the sniffer from the database 550.

In some examples, the device configurator 520 includes means to configure a station, such as one of the stations 110a-d, 302a-b of FIGS. 1-3. For example, the device configurator 520 may instruct the first station 110a to change a parameter such as an SSID, a channel, a frequency, etc., and/or a combination thereof. In other examples, the device configurator 520 can instruct the first station 110a to change to a different medium. For example, the device configurator 520 may direct the first station 110a to change from a Wi-Fi SSID, a Wi-Fi channel, a Wi-Fi frequency, etc., to a Bluetooth SSID, a Bluetooth channel, a Bluetooth frequency, etc. In some examples, the device configurator 520 determines a sniffer of interest to process. For example, the device configurator 520 may select the first sniffer 108a to process. In other examples, the device configurator 520 may determine to configure the TSS 102 to have capture parameters associated with the first station 110a. In some examples, the device configurator 520 retrieves the parameters to configure the station from the database 550.

In the illustrated example of FIG. 5, the controller 106 includes the parameter determiner 530 to calculate and/or otherwise determine time synchronization factors. In some examples, the parameter determiner 530 includes means to calculate a time-correction factor associated with a sniffer. For example, the parameter determiner 530 may determine whether a common frame, such as a common data frame, a common management frame, etc., has been captured. The parameter determiner 530 may identify a common data frame, a common management frame, etc., that is included in both a first data stream obtained from the first sniffer 108a and a second data stream obtained from the TSS 102 when the TSS 102 is configured using the same capture parameters as the first sniffer 108*a*. In such examples, the parameter determiner 530 can determine a time-correction factor by calculating or determining a difference between (1) a first timestamp of the common data frame included in the first data stream and (2) a second timestamp of the common data frame included in the second data stream. In some examples, the parameter determiner 530 stores the time-correction factor in the database 550.

In the illustrated example of FIG. 5, the controller 106 includes the stream generator 540 to generate the unified data stream 120 of FIG. 1A based on one or more data streams obtained from one or sniffers. In some examples, the stream generator 540 includes means to apply time-correction factors to data frames included in data streams to generate the unified data stream 120. For example, the stream generator 540 may select a frame index of the data streams to process. The stream generator 540 may select a first frame index of a first data stream associated with the first sniffer 108*a*, a second data stream associated with the second sniffer 108*b*, etc. The stream generator 540 can apply a corresponding one of the time-correction factors to data frames at the first frame index to generate an adjusted data frame. For example, the stream generator 540 can adjust a first timestamp of a first data frame at the first frame index of the first data stream with a first time-correction factor determined by the parameter determiner 530. For example, the stream generator 540 may adjust the first timestamp by adding the first time-correction factor of 2.35 millisecond (ms) to the first timestamp. In other examples, the stream generator 540 can adjust the first timestamp by reducing the first timestamp when the first time-correction factor is a negative value.

In some examples, the stream generator 540 generates an adjusted data frame by modifying a timestamp of a data frame with a time-correction factor. In some examples, the stream generator 540 selects an adjusted data frame from a plurality of adjusted frames when the adjusted data frame has the oldest timestamp. In such examples, the stream generator 540 outputs the adjusted data frame with the oldest timestamp to the unified data stream 120. The stream generator 540 can (iteratively) select and output adjusted data frames with the next oldest timestamp to the unified data stream 120. In some examples, the stream generator 540 continuously outputs adjusted data frames to the unified data stream 120. In some examples, the stream generator 540 stores the unified data stream 120 in the database 550. In some examples, the stream generator 540 includes means to present the unified data stream 120 to a user and/or transmit the unified data stream 120 to a computing device for further processing. For example, the stream generator 540 may display the unified data stream 120 on a human machine interface (HMI) of a display.

In the illustrated example of FIG. 5, the controller 106 includes the database 550 to record and/or otherwise store data. For example, the database 550 may store data streams from sniffers, capture parameters, station parameters, time-correction factors, adjusted data frames, the unified data stream 120, etc. The database 550 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 550 can additionally or alternatively be implemented by one or more double data rate (DDR) memories, such as DDR, DDR2, DDR3, mobile DDR (mDDR), etc. The database 550 can additionally or alternatively be implemented by one or more mass storage devices such as hard disk drive(s), compact disk drive(s) digital versatile disk drive(s), etc. While in the illustrated example of FIG. 5 the database 550 is illustrated as a single database, the database 550 can be implemented by any number and/or type(s) of databases. Furthermore, the data stored in the database 550 can be in any data format such as, for example, binary data, comma delimited data, tab delimited data, structured query language (SQL) structures, etc.

While an example manner of implementing the controller 106 of FIGS. 1-4 is illustrated in FIG. 5, one or more of the elements, processes, and/or devices illustrated in FIG. 5 may be combined, divided, re-arranged, omitted, eliminated, and/or implemented in any other way. Further, the example data collector 510, the example device configurator 520, the example parameter determiner 530, the example stream generator 540, the example database 550, and/or, more generally, the example controller 106 of FIGS. 1-4 may be implemented by hardware, software, firmware, and/or any combination of hardware, software, and/or firmware. Thus, for example, any of the example data collector 510, the example device configurator 520, the example parameter determiner 530, the example stream generator 540, the example database 550, and/or, more generally, the example controller 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example data collector 510, the example device configurator 520, the example parameter determiner 530, the example stream generator 540, and/or the example database 550 is/are hereby expressly defined to include a non-transitory computer readable storage device or storage disk such as a memory, a digital versatile disk (DVD), a compact disk (CD), a Blu-ray disk, etc., including the software and/or firmware. Further still, the example controller 106 of FIGS. 1-4 may include one or more elements, processes, and/or devices in addition to, or instead of, those illustrated in FIG. 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
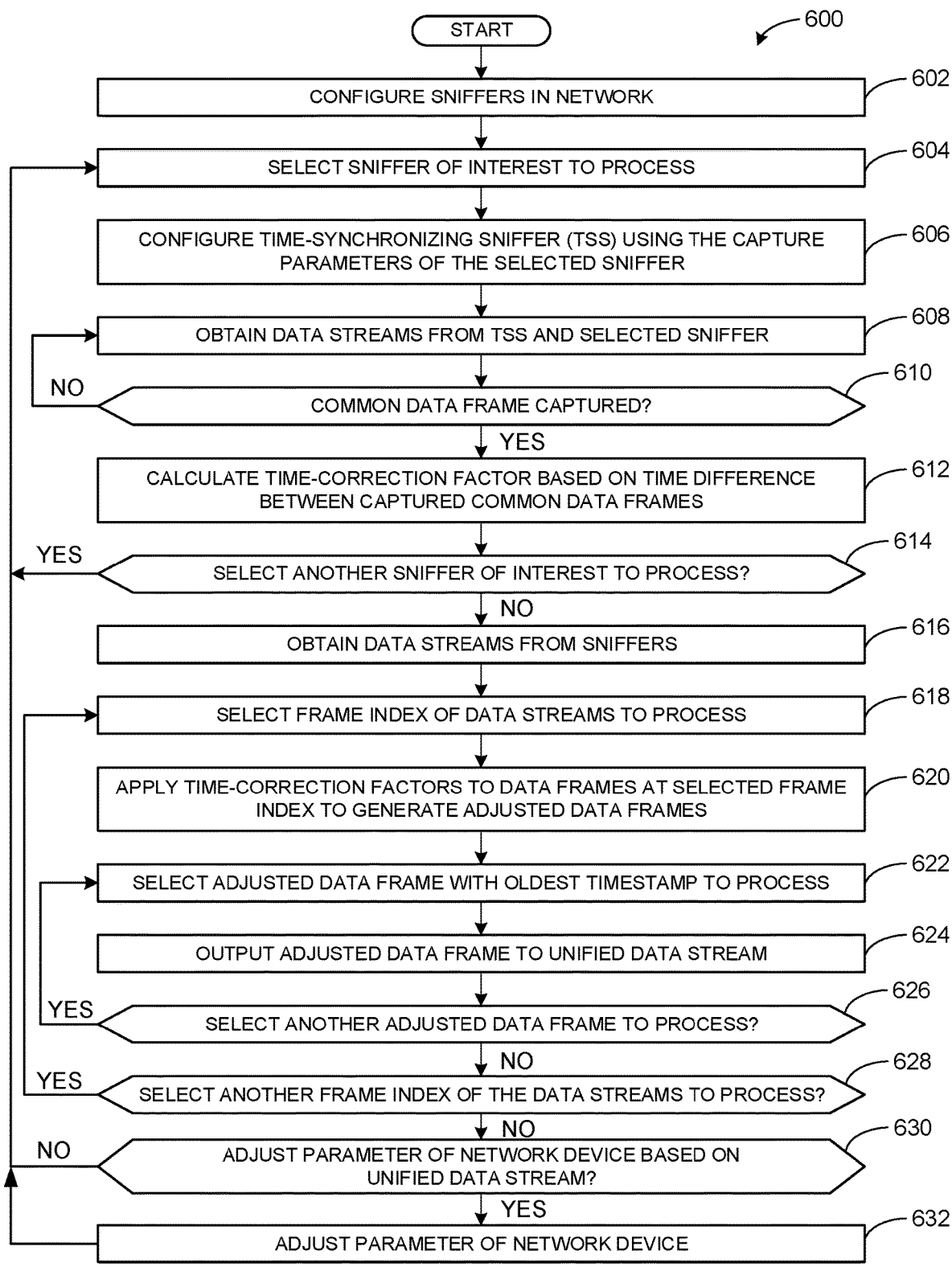
FIG. 6 is a flowchart representative of machine readable instructions which may be executed to implement the example controller of FIG. 5.

A flowchart representative of example hardware logic, machine readable instructions, hardware implemented state machines, and/or any combination thereof for implementing the controller 106 of FIGS. 1-5 is shown in FIG. 6. The machine readable instructions may be an executable program or portion of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 6, many other methods of implementing the example controller 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of example machine readable instructions 600 which may be executed to implement the controller 106 of FIGS. 1-5 to synchronize data streams of network traffic. The machine readable instructions 600 of FIG. 6 begin at block 602, at which the controller 106 configures sniffers in a network. For example, the device configurator 520 (FIG. 5) may configure the sniffers 108*a*-*d* of FIG. 1A using one or more capture parameters including a SSID, a channel, a frequency, etc., and/or a combination thereof.

At block 604, the controller 106 selects a sniffer of interest to process. For example, the device configurator 520 may select the first sniffer 108*a* to process for data stream time synchronization. At block 606, the controller 106 configures a time-synchronization sniffer (TSS) using the capture parameters of the selected sniffer. For example, the device configurator 520 may configure the TSS 102 of FIGS. 1-5 with the capture parameters being used by the first sniffer 108*a*.

At block 608, the controller 106 obtains data streams from the TSS and the selected sniffer. For example, the data collector 510 (FIG. 5) may obtain a first data stream from the TSS 102 and a second data stream from the first sniffer 108*a*.

At block 610, the controller 106 determines whether a common data frame has been captured. For example, the parameter determiner 530 (FIG. 5) may determine that a data frame is included in the first data stream and the second data stream. In other examples, the controller 106 may determine whether a management frame has been captured.

If, at block 610, the controller 106 determines that a common data frame has not been captured, control returns to block 608 to continue obtaining data streams from the TSS and the selected sniffer. If, at block 610, the controller 106 determines that the common data frame has been captured, then, at block 612, the controller 106 calculates a time-correction factor based on a time difference between the captured common data frames. For example, the parameter determiner 530 may calculate a difference between (1) a first timestamp of the common data frame included in the first data stream and (2) a second timestamp of the common data frame included in the second data stream. In other examples, the parameter determiner 530 can calculate a difference between (1) a first timestamp of the management frame included in the first data stream and (2) a second timestamp of the management frame included in the second data stream.

At block 614, the controller 106 determines whether to select another sniffer of interest to process. For example, the device configurator 520 may select the second sniffer 108*b* to process. If, at block 614, the controller 106 determines to select another sniffer of interest to process, control returns to block 604 to select another sniffer of interest to process. If, at block 614, the controller 106 determines not to select another sniffer of interest to process, then, at block 616, the controller 106 obtains data streams from the sniffers. For example, the data collector 510 may obtain data streams from the sniffers 108*a*-*d* of FIG. 1A.

At block 618, the controller 106 selects a frame index of data streams to process. For example, the stream generator 540 (FIG. 5) may select a first frame index to process. At block 620, the controller 106 applies time-correction factors to data frames at the selected frame index to generate adjusted data frames. For example, the stream generator 540 may adjust a first data frame in the first data stream at the first frame index with a first time-correction factor that is associated with the first sniffer 108*a* to generate a first adjusted data frame. In other examples, the stream generator 540 may adjust a second data frame in the second data stream at the first frame index with a second time-correction factor that is associated with the second sniffer 108*b* to generate a second adjusted data frame. In some examples, the second adjusted data frame has a timestamp that is older than the first adjusted data frame.

At block 622, the controller 106 selects an adjusted data frame with the oldest timestamp to process. For example, the stream generator 540 may select the second adjusted data frame because the second adjusted data frame has a timestamp that is older than a timestamp of the first adjusted data frame.

At block 624, the controller 106 outputs the adjusted data frame to a unified data stream. For example, the stream generator 540 may output the second adjusted data frame to the unified data stream 120 of FIG. 1A. In such examples, the stream generator 540 can output the second adjusted data frame and the second timestamp to a display presentable to a user, to another computer device for further processing, etc.

At block 626, the controller 106 determines whether to select another adjusted data frame to process. For example, the stream generator 540 may select the first adjusted data frame to process. If, at block 626, the controller 106 determines to select another adjusted data frame to process, control proceeds to block 622 to select another adjusted data frame with the next oldest timestamp. If, at block 626, the controller 106 determines not to select another adjusted data frame to process, then, at block 628, the controller 106 determines whether to select another frame index of the data streams to process. For example, the stream generator 540 may determine to select a second frame index of the data streams to process.

If, at block 628, the controller 106 determines to select another frame index of the data streams to process, control returns to block 618 to select another frame index of the data streams to process, otherwise the controller 106 determines whether to adjust a parameter of a network device based on the unified data stream at block 630. For example, the device configurator 520 may determine that a Wi-Fi channel being used by the first station 110*a* is being overutilized based on the unified data stream 120. In other examples, the device configurator 520 can determine that the Wi-Fi channel being used by the first station 110*a* has failed based on the first station 110*a* not transmitting an acknowledgment (ACK) packet to the AP 112 in response to a ping packet being transmitted by the AP 112 to the first station 110*a*.

If, at block 630, the controller 106 determines not to adjust a parameter of the network device, control returns to block 604 to select a sniffer of interest to process. If, at block 630, the controller 106 determines to adjust a parameter of the network device, then, at block 632, the controller 106 adjusts the parameter of the network device. For example, the device configurator 520 can transmit instructions to the first station 110*a* via the parameter configurator 118 to direct the first station 110*a* to move from a first Wi-Fi channel to a second Wi-Fi channel, where the second Wi-Fi channel is less utilized than the first Wi-Fi channel. In other examples, the device configurator 520 can transmit instructions to the first station 110*a* to switch from Wi-Fi communication to Bluetooth communication (e.g., by directing the first station 110*a* to switch to a Bluetooth SSID, channel, frequency, etc., and/or a combination thereof). In response to adjusting the parameter of the network device at block 632, the machine readable instructions 600 of FIG. 6 return to block 604 to select another sniffer of interest to process.

Figure 7:
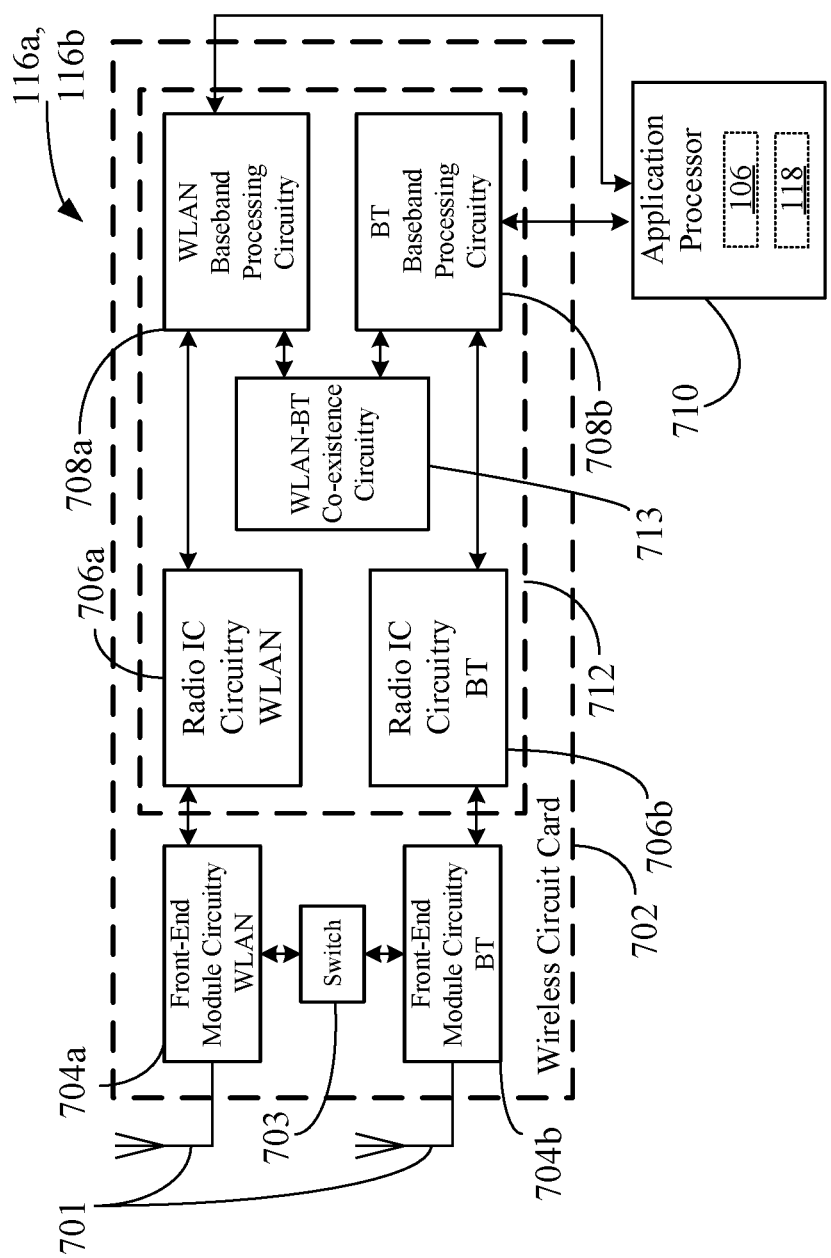
FIG. 7 is a block diagram of a radio architecture in accordance with some examples.

FIG. 7 is a block diagram of a radio architecture 116*a*, 116*b* in accordance with some embodiments that may be implemented in any one of the TSS 102, the sniffers 108*a-d*, 304*a-b*, the stations 110*a-d*, 302*a-b*, and/or the AP 112 of FIGS. 1-4. Radio architecture 116*a*, 116*b* may include radio front-end module (FEM) circuitry 704*a-b*, radio IC circuitry 706*a-b* and baseband processing circuitry 708*a-b*. Radio architecture 116*a*, 116*b* as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704*a-b* may include a WLAN or Wi-Fi FEM circuitry 704*a* and a Bluetooth (BT) FEM circuitry 704*b*. The WLAN FEM circuitry 704*a* may include a receive signal path comprising circuitry configured to operate on WLAN RF signals received from one or more antennas 701, to amplify the received signals and to provide the amplified versions of the received signals to the WLAN radio IC circuitry 706*a* for further processing. The BT FEM circuitry 704*b* may include a receive signal path which may include circuitry configured to operate on BT RF signals received from one or more antennas 701, to amplify the received signals and to provide the amplified versions of the received signals to the BT radio IC circuitry 706*b* for further processing. FEM circuitry 704*a* may also include a transmit signal path which may include circuitry configured to amplify WLAN signals provided by the radio IC circuitry 706*a* for wireless transmission by one or more of the antennas 701. In addition, FEM circuitry 704*b* may also include a transmit signal path which may include circuitry configured to amplify BT signals provided by the radio IC circuitry 706*b* for wireless transmission by the one or more antennas. In the embodiment of FIG. 7, although FEM 704*a* and FEM 704*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706*a-b* as shown may include WLAN radio IC circuitry 706*a* and BT radio IC circuitry 706*b*. The WLAN radio IC circuitry 706*a* may include a receive signal path which may include circuitry to down-convert WLAN RF signals received from the FEM circuitry 704*a* and provide baseband signals to WLAN baseband processing circuitry 708*a*. BT radio IC circuitry 706*b* may in turn include a receive signal path which may include circuitry to down-convert BT RF signals received from the FEM circuitry 704*b* and provide baseband signals to BT baseband processing circuitry 708*b*. WLAN radio IC circuitry 706*a* may also include a transmit signal path which may include circuitry to up-convert WLAN baseband signals provided by the WLAN baseband processing circuitry 708*a* and provide WLAN RF output signals to the FEM circuitry 704*a* for subsequent wireless transmission by the one or more antennas 701. BT radio IC circuitry 706*b* may also include a transmit signal path which may include circuitry to up-convert BT baseband signals provided by the BT baseband processing circuitry 708*b* and provide BT RF output signals to the FEM circuitry 704*b* for subsequent wireless transmission by the one or more antennas 701. In the embodiment of FIG. 7, although radio IC circuitries 706*a* and 706*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a link aggregator for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 116a, 116b may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 116a, 116b may be part of a Wi-Fi communication station (STA) such as a wireless access point (AP), a base station or a mobile device including a Wi-Fi device. In some of these embodiments, radio architecture 116a, 116b may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 116a, 116b may also be suitable to transmit and/or receive communications in accordance with other techniques and standards.

In some embodiments, the radio architecture 116a, 116b may be configured for high-efficiency Wi-Fi (HEW) communications in accordance with the IEEE 802.11ax standard. In these embodiments, the radio architecture 116a, 116b may be configured to communicate in accordance with an OFDMA technique, although the scope of the embodiments is not limited in this respect.

In some other embodiments, the radio architecture 116a, 116b may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Figure 10:
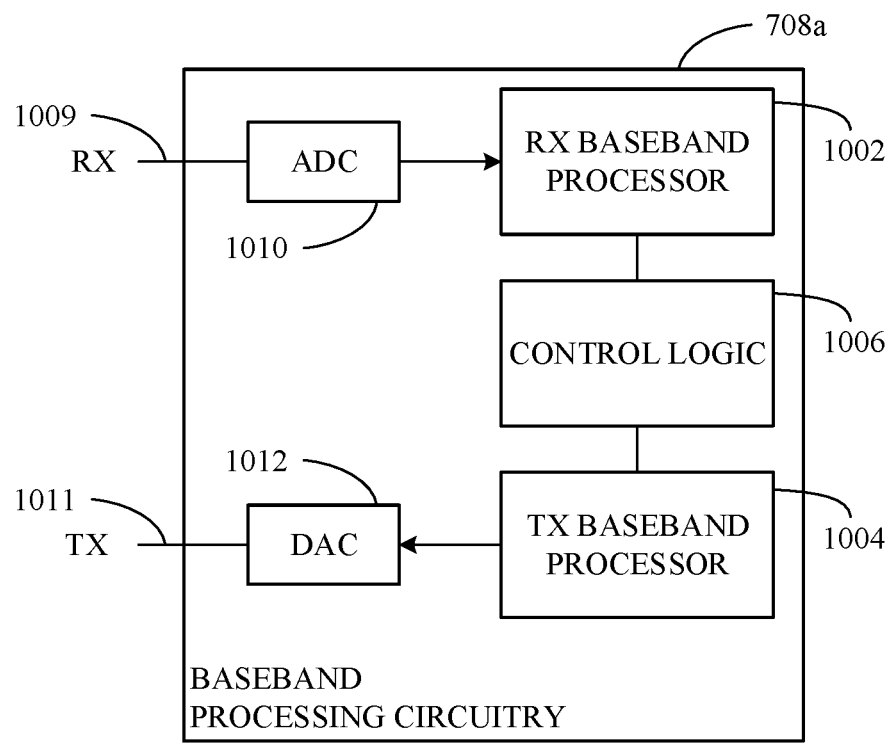
FIG. 10 illustrates an example baseband processing circuitry for use in the radio architecture of FIG. 7 in accordance with some examples.

In some embodiments, as further shown in FIG. 10, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 116a, 116b may include other radio cards, such as a cellular radio card configured for cellular (e.g., 3GPP such as LTE, LTE-Advanced or 5G communications).

In some IEEE 802.11 embodiments, the radio architecture 116a, 116b may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
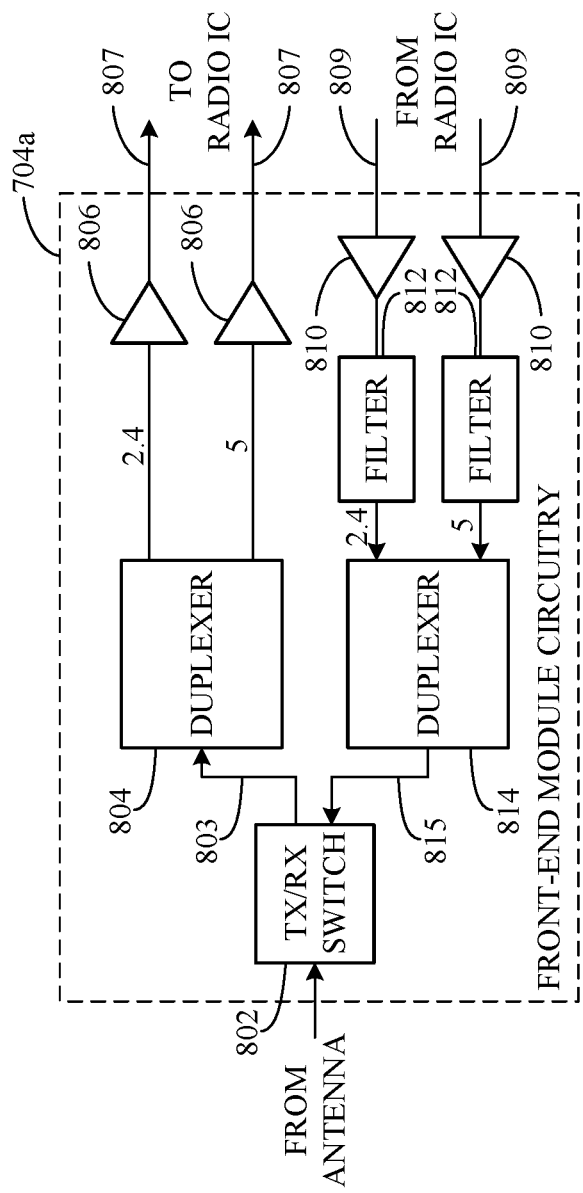
FIG. 8 illustrates an example front-end module circuitry for use in the radio architecture of FIG. 7 in accordance with some examples.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 1404a as the one used for WLAN communications.

Figure 9:
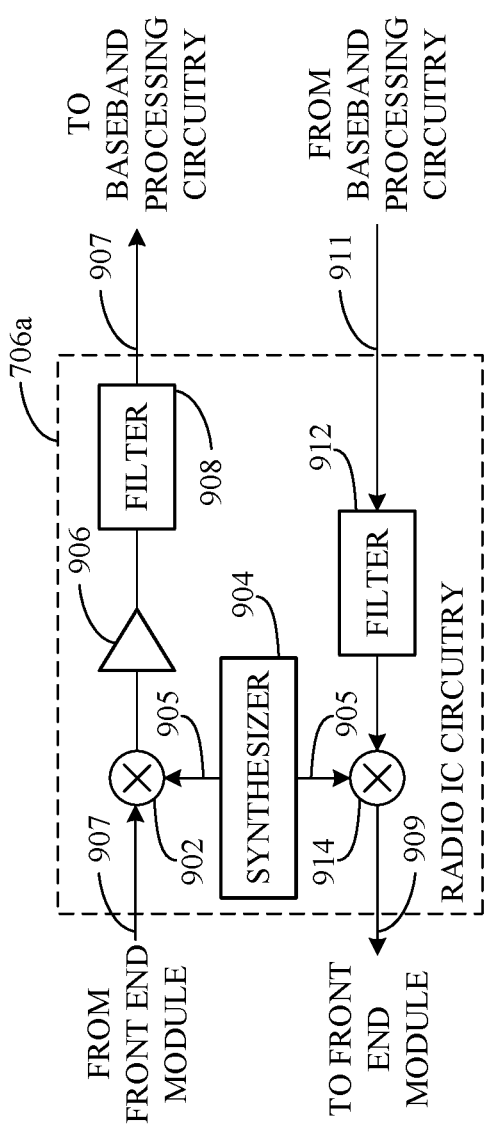
FIG. 9 illustrates an example radio circuitry for use in the radio architecture of FIG. 7 in accordance with some examples.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 1407 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 909 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 907 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 (FIG. 9) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, the parameter configurator 118.

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 10 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 116a, 116b is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 11:
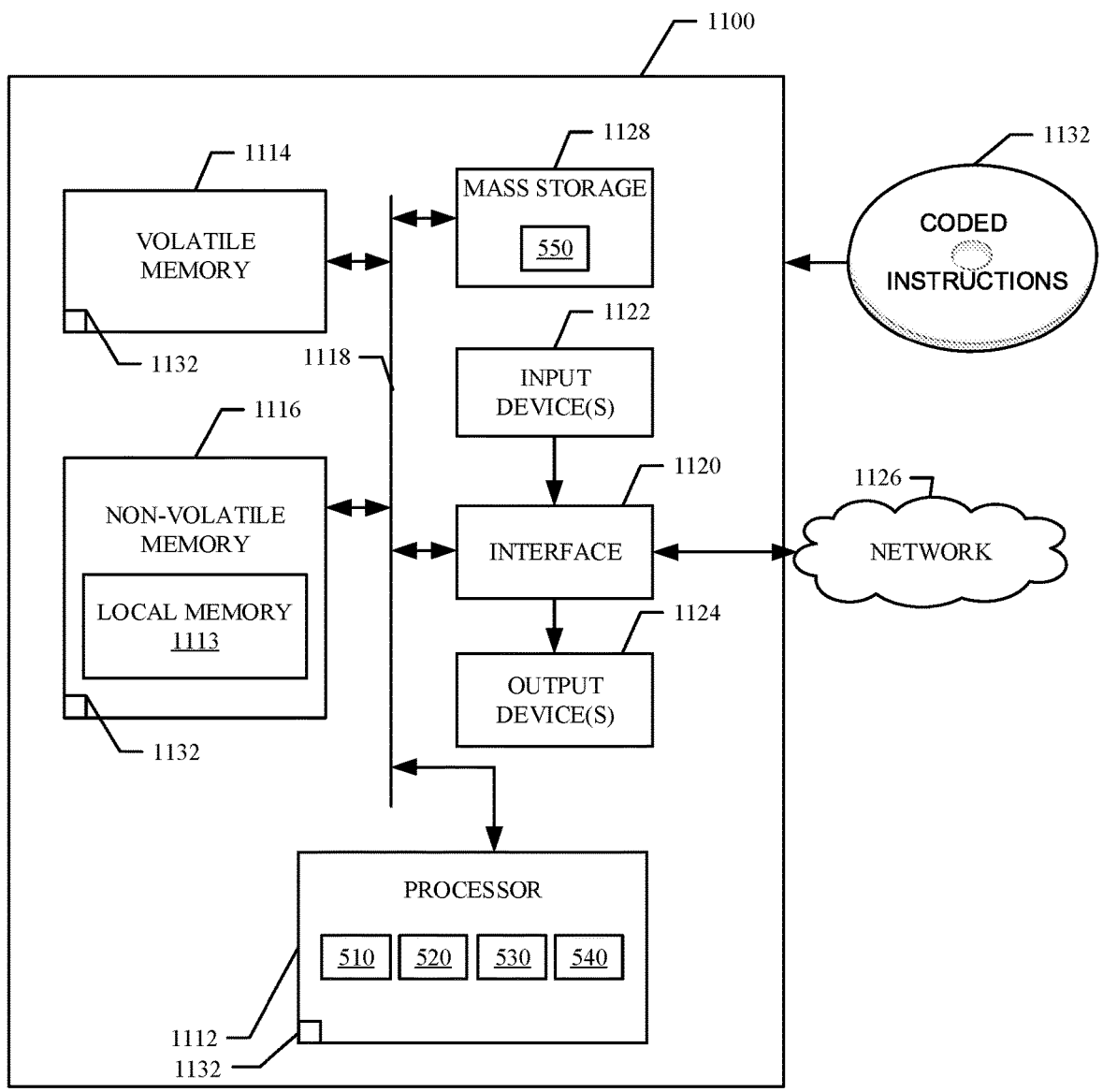
FIG. 11 is a block diagram of an example processing platform structured to execute the instructions of FIG. 6 to implement the example controller of FIG. 5.

FIG. 11 is a block diagram of an example processor platform 1100 structured to execute the instructions of FIG. 6 to implement the controller 106 of FIGS. 1-5. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the data collector 510, the device configurator 520, the parameter determiner 530, and the stream generator 540 of FIG. 5.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the one or more mass storage devices 1128 implement the database 550 of FIG. 5.

The machine executable instructions 1132 of FIG. 6 may be stored in the mass storage device 1128, in the volatile memory 1114, in the non-volatile memory 1116, and/or on a removable non-transitory computer readable storage medium such as a CD or DVD.

Figure 12:
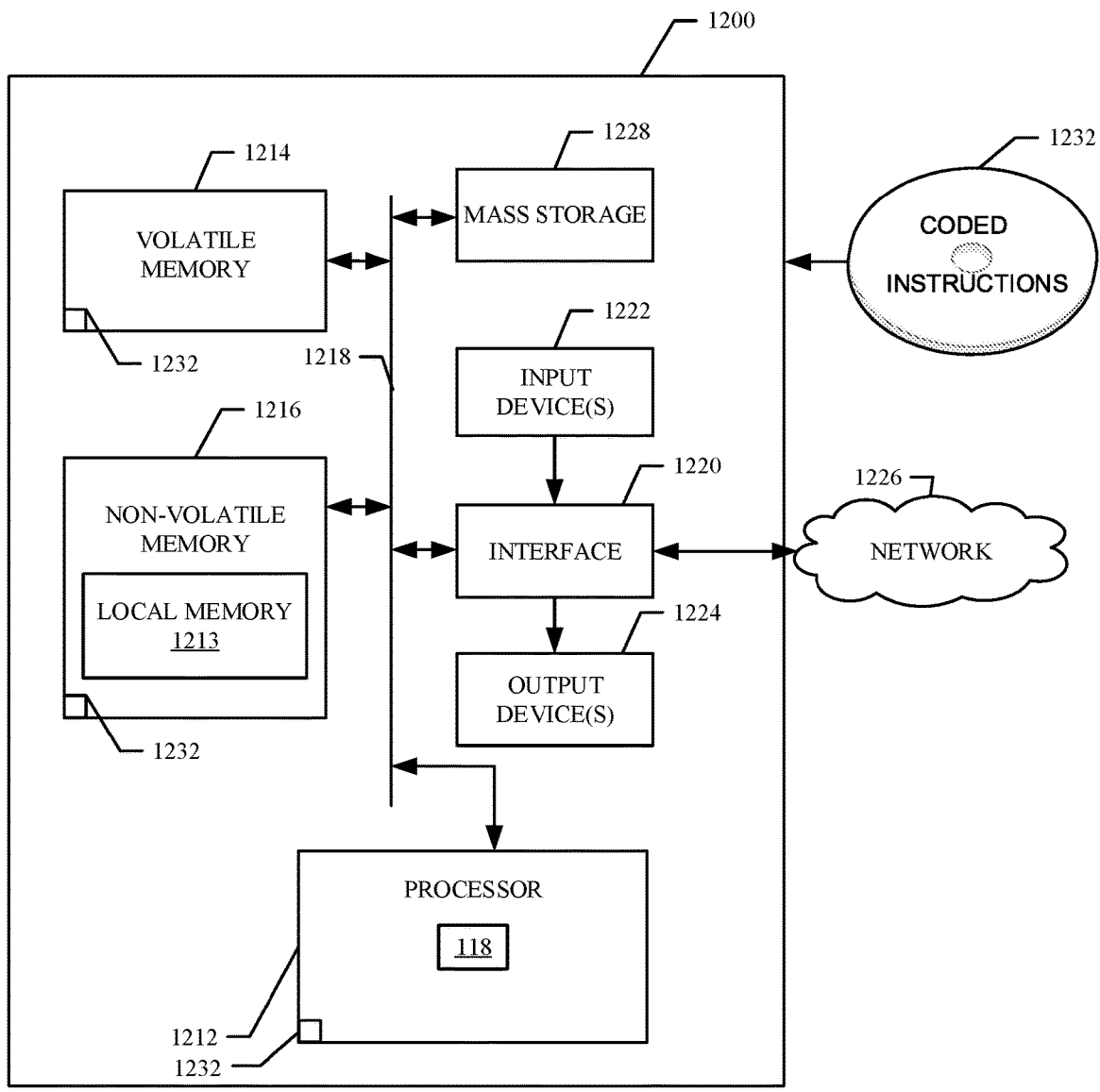
FIG. 12 is a block diagram of an example processing platform structured to execute instructions to implement the example sniffers, the example stations, and/or the example access point of FIGS. 1A and 2-4.

FIG. 12 is a block diagram of an example processor platform 1200 structured to execute instructions to implement the TSS 102, the sniffers 108a-d, 304a-b, the stations 110a-d, 302a-b, and/or the AP 112 of FIGS. 1-4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the parameter configurator 118 of FIGS. 1-4.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 may be stored in the mass storage device 1228, in the volatile memory 1214, in the non-volatile memory 1216, and/or on a removable non-transitory computer readable storage medium such as a CD or DVD.

From the foregoing, it will be appreciated that example systems, methods, apparatus and articles of manufacture have been disclosed for parallel sniffing on non-identical mediums. The disclosed systems, methods, apparatus, and articles of manufacture simultaneously capture data traffic sent over different, non-overlapping Wi-Fi channels, as well as simultaneously capturing data traffic sent over different connectivity protocols that cannot be captured at the same time by a single device. The disclosed systems, methods, apparatus, and articles of manufacture provide a unified and synchronized output that gives an end-user and/or an end-computing device a complete over-the-air data traffic visibility in real time.

The disclosed systems, methods, apparatus, and articles of manufacture improve the efficiency of using a computing device by adjusting capture parameters, network parameters, station parameters, etc., of the computing device based on a unified data stream. The disclosed systems, methods, apparatus, and articles of manufacture can identify network distresses such as bottlenecks, congestion points, and failures of a network, a network channel, a network frequency, etc. By identifying the network distresses, the disclosed systems, methods, apparatus, and articles of manufacture can switch a computing device from a distressed network aspect such as a congested Wi-Fi channel to a non-distressed network aspect such as a non-congested Wi-Fi channel. Thus, the network capabilities of the computing device can facilitate high-speed, high-throughput network data transfer in the event of a network distress. The disclosed methods, apparatus and articles of manufacture are accordingly directed to one or more improvement(s) in the functioning of a computer.

The following pertain to further examples disclosed herein.

Example 1 includes an apparatus to synchronize captured network traffic, the apparatus comprising a device configurator to configure a first sniffer using a first parameter of a second sniffer to generate a first data stream, a parameter determiner to identify a common frame included in the first data stream and a second data stream, the second data stream generated by the second sniffer, and determine a first time-correction factor by determining a difference between a first timestamp of the common frame in the first data stream and a second timestamp of the common frame in the second data stream, and a stream generator to generate a third data stream including first data frames from the first sniffer and second data frames from a third sniffer, the first data frames based on the first time-correction factor, the second data frames based on a second time-correction factor, the second time-correction factor based on configuring the first sniffer using a second parameter of the third sniffer, the second parameter different from the first parameter.

Example 2 includes the apparatus of example 1, wherein the first parameter is a wireless service set identifier, a wireless channel, or a wireless frequency.

Example 3 includes the apparatus of example 1, wherein the first parameter is a Wi-Fi parameter and the second parameter is a Bluetooth parameter.

Example 4 includes the apparatus of example 1, wherein the stream generator is to generate the third data stream by selecting a frame index of the first data stream and the second data stream, generate a first one of the first data frames based on the first time-correction factor and a first data frame in the second data stream at the frame index, generate a first one of the second data frames based on the second time-correction factor and a second data frame in the third data stream at the frame index, and in response to determining that the first one of the first data frames has a third timestamp that is older than a fourth timestamp of the first one of the second data frames, outputting the first one of the first data frames to the third data stream.

Example 5 includes the apparatus of example 1, wherein the device configurator is to adjust the first parameter of a station to a third parameter based on the third data stream.

Example 6 includes the apparatus of example 5, wherein the first parameter is a Wi-Fi parameter and the third parameter is a Bluetooth parameter, the Bluetooth parameter to cause the station to switch from communicating with an access point via Wi-Fi to Bluetooth.

Example 7 includes the apparatus of example 1, wherein the stream generator is to store the third data stream in a database and output the third data stream to a display.

Example 8 includes a non-transitory computer readable storage medium comprising instructions which, when executed, cause a machine to at least configure a first sniffer using a first parameter of a second sniffer to generate a first data stream, identify a common frame included in the first data stream and a second data stream, the second data stream generated by the second sniffer, determine a first time-correction factor by determining a difference between a first timestamp of the common frame in the first data stream and a second timestamp of the common frame in the second data stream, and generate a third data stream including first data frames from the first sniffer and second data frames from a third sniffer, the first data frames based on the first time-correction factor, the second data frames based on a second time-correction factor, the second time-correction factor based on configuring the first sniffer using a second parameter of the third sniffer, the second parameter different from the first parameter.

Example 9 includes the non-transitory computer readable storage medium of example 8, wherein the first parameter is a wireless service set identifier, a wireless channel, or a wireless frequency.

Example 10 includes the non-transitory computer readable storage medium of example 8, wherein the first parameter is a Wi-Fi parameter and the second parameter is a Bluetooth parameter.

Example 11 includes the non-transitory computer readable storage medium of example 8, further including instructions which, when executed, cause the machine to at least select a frame index of the first data stream and the second data stream, generate a first one of the first data frames based on the first time-correction factor and a first data frame in the second data stream at the frame index, generate a first one of the second data frames based on the second time-correction factor and a second data frame in the third data stream at the frame index, and in response to determining that the first one of the first data frames has a third timestamp that is older than a fourth timestamp of the first one of the second data frames, output the first one of the first data frames to the third data stream.

Example 12 includes the non-transitory computer readable storage medium of example 8, further including instructions which, when executed, cause the machine to at least adjust the first parameter of a station to a third parameter based on the third data stream.

Example 13 includes the non-transitory computer readable storage medium of example 12, wherein the first parameter is a Wi-Fi parameter and the third parameter is a Bluetooth parameter, the Bluetooth parameter to cause the station to switch from communicating with an access point via Wi-Fi to Bluetooth.

Example 14 includes the non-transitory computer readable storage medium of example 8, further including instructions which, when executed, cause the machine to at least store the third data stream in a database and output the third data stream to a display.

Example 15 includes a method to synchronize captured network traffic, the method comprising configuring a first sniffer using a first parameter of a second sniffer to generate a first data stream, identifying a common frame included in the first data stream and a second data stream, the second data stream generated by the second sniffer, determining a first time-correction factor by determining a difference between a first timestamp of the common frame in the first data stream and a second timestamp of the common frame in the second data stream, and generating a third data stream including first data frames from the first sniffer and second data frames from a third sniffer, the first data frames based on the first time-correction factor, the second data frames based on a second time-correction factor, the second time-correction factor based on configuring the first sniffer using a second parameter of the third sniffer, the second parameter different from the first parameter.

Example 16 includes the method of example 15, wherein the first parameter is a wireless service set identifier, a wireless channel, or a wireless frequency.

Example 17 includes the method of example 15, wherein the first parameter is a Wi-Fi parameter and the second parameter is a Bluetooth parameter.

Example 18 includes the method of example 15, wherein generating the third data stream includes selecting a frame index of the first data stream and the second data stream, generating a first one of the first data frames based on the first time-correction factor and a first data frame in the second data stream at the frame index, generating a first one of the second data frames based on the second time-correction factor and a second data frame in the third data stream at the frame index, and in response to determining that the first one of the first data frames has a third timestamp that is older than a fourth timestamp of the first one of the second data frames, outputting the first one of the first data frames to the third data stream.

Example 19 includes the method of example 15, further including adjusting the first parameter of a station to a third parameter based on the third data stream.

Example 20 includes the method of example 19, wherein the first parameter is a Wi-Fi parameter and the third parameter is a Bluetooth parameter, and further including the station to switch from communicating with an access point via Wi-Fi to Bluetooth.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to synchronize captured network traffic, the apparatus comprising:
   a device configurator to configure a first sniffer using a first parameter of a second sniffer to generate a first data stream;
   a parameter determiner to:
      identify a common frame included in the first data stream and a second data stream, the second data stream generated by the second sniffer; and
      determine a first time-correction factor by determining a difference between a first timestamp of the common frame in the first data stream and a second timestamp of the common frame in the second data stream; and
   a stream generator to generate a third data stream including first data frames from the first sniffer and second data frames from a third sniffer, the first data frames based on the first time-correction factor, the second data frames based on a second time-correction factor, the second time-correction factor based on configuring the first sniffer using a second parameter of the third sniffer, the second parameter different from the first parameter.

2. The apparatus of claim 1, wherein the first parameter is a wireless service set identifier, a wireless channel, or a wireless frequency.

3. The apparatus of claim 1, wherein the first parameter is a Wi-Fi parameter and the second parameter is a Bluetooth parameter.

4. The apparatus of claim 1, wherein the stream generator is to generate the third data stream by:
   selecting a frame index of the first data stream and the second data stream;
   generate a first one of the first data frames based on the first time-correction factor and a first data frame in the second data stream at the frame index;
   generate a first one of the second data frames based on the second time-correction factor and a second data frame in the third data stream at the frame index; and
   in response to determining that the first one of the first data frames has a third timestamp that is older than a fourth timestamp of the first one of the second data frames, outputting the first one of the first data frames to the third data stream.

5. The apparatus of claim 1, wherein the device configurator is to adjust the first parameter of a station to a third parameter based on the third data stream.

6. The apparatus of claim 5, wherein the first parameter is a Wi-Fi parameter and the third parameter is a Bluetooth parameter, the Bluetooth parameter to cause the station to switch from communicating with an access point via Wi-Fi to Bluetooth.

7. The apparatus of claim 1, wherein the stream generator is to store the third data stream in a database and output the third data stream to a display.

8. A non-transitory computer readable storage medium comprising instructions which, when executed, cause a machine to at least:
   configure a first sniffer using a first parameter of a second sniffer to generate a first data stream;
   identify a common frame included in the first data stream and a second data stream, the second data stream generated by the second sniffer;
   determine a first time-correction factor by determining a difference between a first timestamp of the common frame in the first data stream and a second timestamp of the common frame in the second data stream; and
   generate a third data stream including first data frames from the first sniffer and second data frames from a third sniffer, the first data frames based on the first time-correction factor, the second data frames based on a second time-correction factor, the second time-correction factor based on configuring the first sniffer using a second parameter of the third sniffer, the second parameter different from the first parameter.

9. The non-transitory computer readable storage medium of claim 8, wherein the first parameter is a wireless service set identifier, a wireless channel, or a wireless frequency.

10. The non-transitory computer readable storage medium of claim 8, wherein the first parameter is a Wi-Fi parameter and the second parameter is a Bluetooth parameter.

11. The non-transitory computer readable storage medium of claim 8, further including instructions which, when executed, cause the machine to at least:
select a frame index of the first data stream and the second data stream;
generate a first one of the first data frames based on the first time-correction factor and a first data frame in the second data stream at the frame index;
generate a first one of the second data frames based on the second time-correction factor and a second data frame in the third data stream at the frame index; and
in response to determining that the first one of the first data frames has a third timestamp that is older than a fourth timestamp of the first one of the second data frames, output the first one of the first data frames to the third data stream.

12. The non-transitory computer readable storage medium of claim 8, further including instructions which, when executed, cause the machine to at least adjust the first parameter of a station to a third parameter based on the third data stream.

13. The non-transitory computer readable storage medium of claim 12, wherein the first parameter is a Wi-Fi parameter and the third parameter is a Bluetooth parameter, the Bluetooth parameter to cause the station to switch from communicating with an access point via Wi-Fi to Bluetooth.

14. The non-transitory computer readable storage medium of claim 8, further including instructions which, when executed, cause the machine to at least store the third data stream in a database and output the third data stream to a display.

15. A method to synchronize captured network traffic, the method comprising: configuring a first sniffer using a first parameter of a second sniffer to generate a first data stream;
identifying a common frame included in the first data stream and a second data stream, the second data stream generated by the second sniffer;
determining a first time-correction factor by determining a difference between a first timestamp of the common frame in the first data stream and a second timestamp of the common frame in the second data stream; and
generating a third data stream including first data frames from the first sniffer and second data frames from a third sniffer, the first data frames based on the first time-correction factor, the second data frames based on a second time-correction factor, the second time-correction factor based on configuring the first sniffer using a second parameter of the third sniffer, the second parameter different from the first parameter.

16. The method of claim 15, wherein the first parameter is a wireless service set identifier, a wireless channel, or a wireless frequency.

17. The method of claim 15, wherein the first parameter is a Wi-Fi parameter and the second parameter is a Bluetooth parameter.

18. The method of claim 15, wherein generating the third data stream includes:
selecting a frame index of the first data stream and the second data stream;
generating a first one of the first data frames based on the first time-correction factor and a first data frame in the second data stream at the frame index;
generating a first one of the second data frames based on the second time-correction factor and a second data frame in the third data stream at the frame index; and
in response to determining that the first one of the first data frames has a third timestamp that is older than a fourth timestamp of the first one of the second data frames, outputting the first one of the first data frames to the third data stream.

19. The method of claim 15, further including adjusting the first parameter of a station to a third parameter based on the third data stream.

20. The method of claim 19, wherein the first parameter is a Wi-Fi parameter and the third parameter is a Bluetooth parameter, and further including the station to switch from communicating with an access point via Wi-Fi to Bluetooth.

* * * * *